US009408497B2

(12) United States Patent
Conti et al.

(10) Patent No.: US 9,408,497 B2
(45) Date of Patent: Aug. 9, 2016

(54) MULTI-FUNCTIONAL TOASTING PLATFORM UTILIZING A COATED CLEAR-GLASS HEATING ELEMENT

(71) Applicant: Whirlpool Corporation, Benton Harbor, MI (US)

(72) Inventors: Michael P. Conti, St. Joseph, MI (US); Fredrick A. Millett, Turtletown, TN (US)

(73) Assignee: Whirlpool Corporation, Benton Harbor, MI (US)

( * ) Notice: Subject to any disclaimer, the term of this patent is extended or adjusted under 35 U.S.C. 154(b) by 308 days.

(21) Appl. No.: 13/971,953

(22) Filed: Aug. 21, 2013

(65) Prior Publication Data

US 2015/0053094 A1    Feb. 26, 2015

(51) Int. Cl.
*A47J 37/08* (2006.01)
*H05B 3/84* (2006.01)

(52) U.S. Cl.
CPC ............. *A47J 37/0871* (2013.01); *A47J 37/08* (2013.01); *A47J 37/0807* (2013.01); *A47J 37/0857* (2013.01); *H05B 3/84* (2013.01); *H05B 2203/013* (2013.01)

(58) Field of Classification Search
CPC ... A47J 37/0688; A47J 37/08; A47J 37/0807; A47J 37/0857
USPC ............ 99/390, 391, 389, 392, 395, 396, 397
See application file for complete search history.

(56) References Cited

U.S. PATENT DOCUMENTS

| 1,656,848 | A | | 1/1928 | Wyatt | |
|---|---|---|---|---|---|
| 1,769,893 | A | * | 7/1930 | Uhl | ................................. 99/335 |
| 1,973,175 | A | * | 9/1934 | McArdle | ......................... 99/327 |
| 2,140,158 | A | | 12/1938 | Knapp | |
| 2,447,641 | A | | 8/1948 | Dunham | |
| 2,564,677 | A | | 8/1951 | Davis | |
| 2,564,706 | A | | 8/1951 | Mochel | |
| 2,777,044 | A | | 1/1957 | Lytle | |

(Continued)

FOREIGN PATENT DOCUMENTS

| DE | 10147664 A1 | 4/2003 |
|---|---|---|
| EP | 1772085 A1 | 4/2007 |

(Continued)

OTHER PUBLICATIONS

European patent application No. 14179019.6 filed Jul. 29, 2014, applicant: Whirlpool Europe S.r.l., Extended European Search Report dated Jun. 16, 2016 re: same.

*Primary Examiner* — Reginald L Alexander

(57) ABSTRACT

A partially transparent cooking appliance includes first and second plates defining an externally accessible cavity therebetween. The first and second plates are at least partially translucent. A base is pivotally coupled with the first and second plates. The first and second plates are operable between a horizontal position and a vertical position relative to the base and an electrically resistive coating disposed on at least a portion of the first and second plates. The electrically resistive coating is in thermal communication with the cavity. A cam mechanism is operably coupled with at least one of the first and second plates. The first and second plates are operable between first and second distances relative to one another and a user interface is disposed on an exterior surface of an outer plate. The user interface is in electrical communication with the electrically resistive coating.

17 Claims, 28 Drawing Sheets

(56) References Cited

U.S. PATENT DOCUMENTS

| | | | | |
|---|---|---|---|---|
| 3,524,404 | A | * | 8/1970 | Shinzo et al. ............... 99/390 |
| 3,641,921 | A | | 2/1972 | Toyooka et al. |
| 4,645,905 | A | * | 2/1987 | Ming ........................ 392/444 |
| 4,889,974 | A | | 12/1989 | Auding et al. |
| 5,006,690 | A | | 4/1991 | Cole et al. |
| 5,138,938 | A | | 8/1992 | McClean |
| 5,193,439 | A | * | 3/1993 | Finesman et al. ............ 99/327 |
| 5,487,328 | A | | 1/1996 | Fujii |
| 5,960,702 | A | | 10/1999 | Thiriat et al. |
| 6,109,169 | A | * | 8/2000 | Masel et al. ................ 99/334 |
| 6,125,234 | A | * | 9/2000 | de Jenlis ................... 392/439 |
| 6,311,609 | B1 | | 11/2001 | Dotan |
| 6,341,554 | B2 | | 1/2002 | Thiriat |
| 6,357,343 | B1 | * | 3/2002 | Tomsich et al. ......... 99/329 RT |
| 6,397,732 | B1 | | 6/2002 | Jenkins |
| 6,639,187 | B2 | | 10/2003 | Arel et al. |
| 6,657,168 | B1 | | 12/2003 | Lazzer |
| 6,675,700 | B2 | | 1/2004 | Hong |
| 6,717,110 | B2 | * | 4/2004 | Van der Meer et al. ...... 219/386 |
| 7,351,939 | B2 | | 4/2008 | Boyle et al. |
| 7,514,655 | B2 | | 4/2009 | Fernandez et al. |
| 8,291,813 | B2 | * | 10/2012 | Leaman ....................... 99/393 |
| 8,720,323 | B2 | * | 5/2014 | Douglas et al. ............... 99/385 |
| 2001/0042447 | A1 | * | 11/2001 | Thiriat ........................ 99/327 |
| 2002/0076215 | A1 | | 6/2002 | Tsao |
| 2009/0158939 | A1 | | 6/2009 | Jensen |
| 2009/0288563 | A1 | | 11/2009 | Lim |
| 2011/0303099 | A1 | | 12/2011 | Lazzer |
| 2014/0157996 | A1 | * | 6/2014 | Korbin ........................ 99/342 |

FOREIGN PATENT DOCUMENTS

| | | |
|---|---|---|
| FR | 2763233 A1 | 5/1998 |
| FR | 2759842 A1 | 8/1998 |
| GB | 2470292 A | 11/2010 |

* cited by examiner

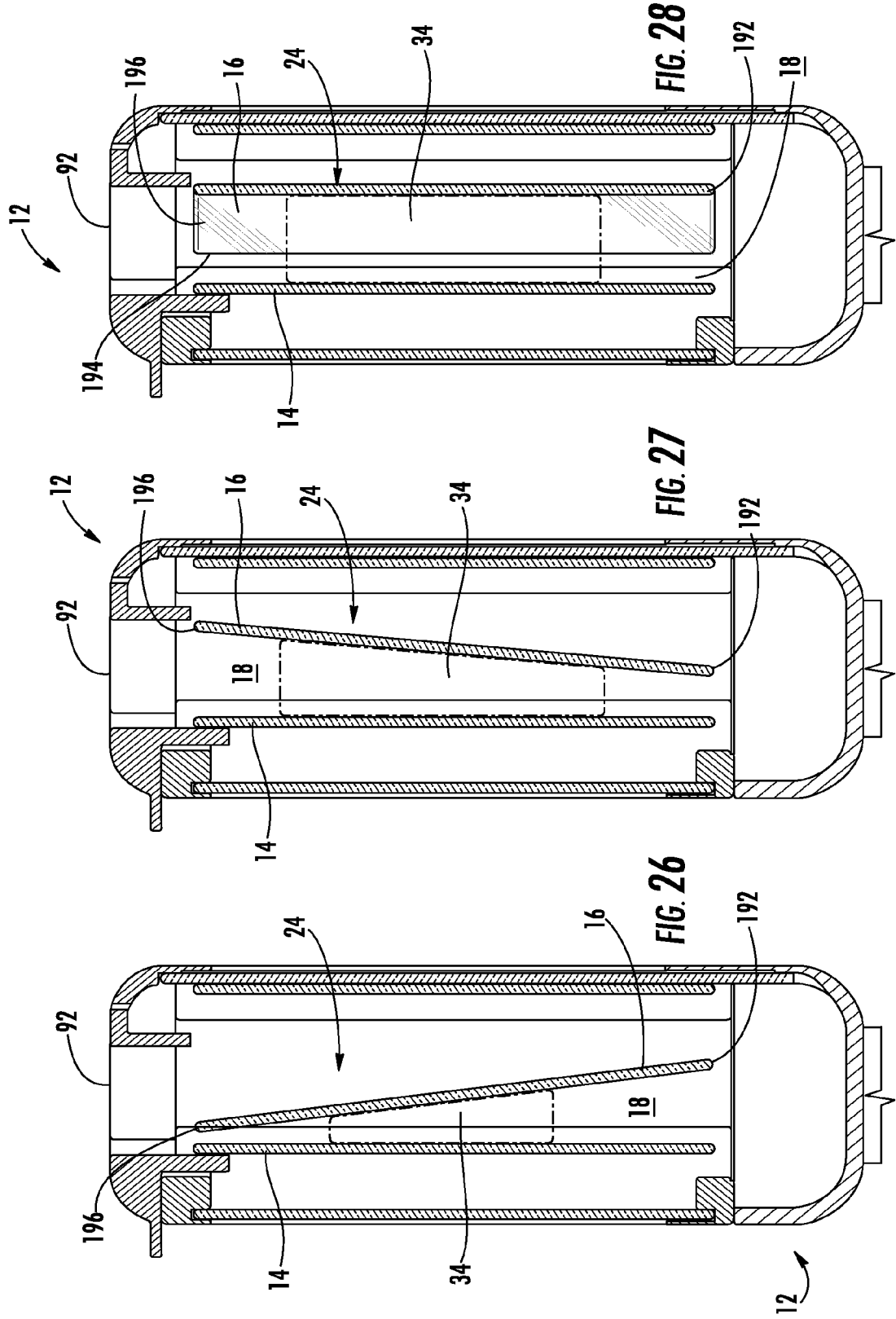

MULTI-FUNCTIONAL TOASTING PLATFORM UTILIZING A COATED CLEAR-GLASS HEATING ELEMENT

BACKGROUND

The present device generally relates to cooking and toasting appliances, and more specifically, to a cooking or toasting appliance having a heating element including clear glass with an electrically resistive coating.

SUMMARY

In one aspect, a cooking appliance includes a housing including first and second plates. The first and second plates are at least partially translucent and parallel with one another. A cavity is defined between the first and second plates and a partially conductive coating is disposed on a portion of the first and second plates proximate the cavity. A cam mechanism is operably coupled with the second plate and is configured to move the second plate between a cooking position and a non-cooking position. A user interface is accessible from an exterior surface of the housing, and is in electrical communication with the partially conductive coating. The partially conductive coating is in thermal communication with the cavity.

In another aspect, a partially transparent cooking appliance includes first and second plates defining an externally accessible cavity therebetween. The first and second plates are at least partially translucent. A base is pivotally coupled with the first and second plates. The first and second plates are operable between a horizontal position and a vertical position relative to the base and an electrically resistive coating disposed on at least a portion of the first and second plates. The electrically resistive coating is in thermal communication with the cavity. A cam mechanism is operably coupled with at least one of the first and second plates. The first and second plates are operable between first and second distances relative to one another and a user interface is disposed on an exterior surface of an outer plate. The user interface is in electrical communication with the electrically resistive coating.

In yet another aspect, a pivotally operable cooking appliance includes a housing defining an access aperture and a cavity. The housing includes first and second plates, wherein at least one of the first and second plates defines a translucent window. A conductive coating is disposed on at least a portion of the first and second plates proximate the cavity and in thermal communication with the cavity. A cam mechanism is disposed in the housing and in operable communication with the second plate, wherein the cam mechanism is configured to move the second plate relative to the first plate and a user interface disposed on an exterior surface of an outer plate. The user interface is in electrical communication with the conductive coating, and the outer plate further defines the translucent window.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 26 is a schematic cross-sectional view of an alternate embodiment of the housing showing a first tilting motion of the second plate;

FIG. 27 is a schematic cross-sectional view of the housing of FIG. 26, showing a second tilting motion of the second plate;

FIG. 28 is a schematic cross-sectional view of the housing of FIG. 26, showing a twisting motion of the second plate;

DETAILED DESCRIPTION OF EMBODIMENTS

Figure 1:
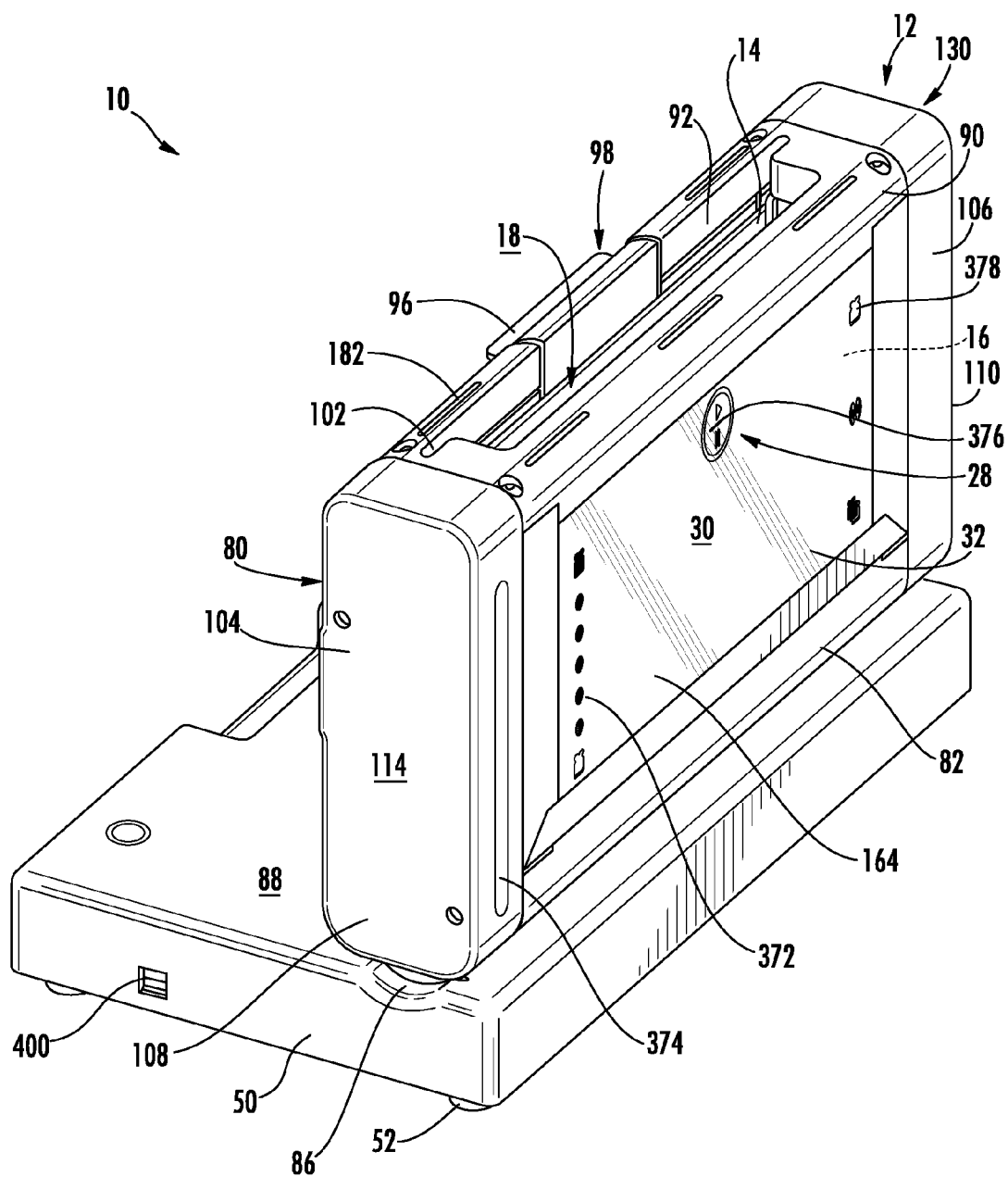
FIG. 1 is a front perspective view of the cooking appliance with the housing in the vertical position.
Figure 2:
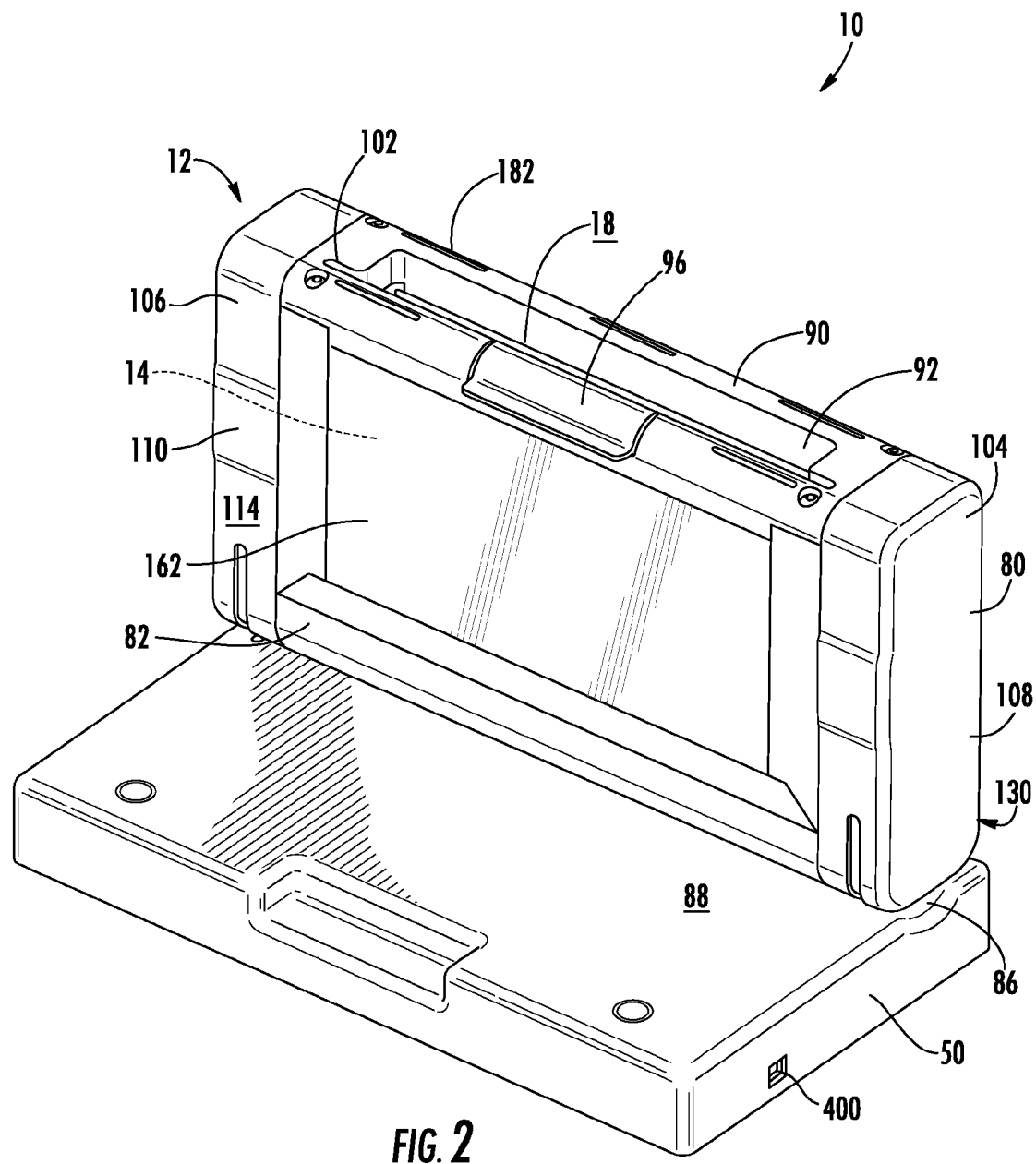
FIG. 2 is a rear perspective view of the cooking appliance of FIG. 1.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-8, reference numeral 10 generally refers to a cooking appliance 10 that includes a housing 12 having first and second plates 14, 16, wherein the first and second plates 14, 16 are at least partially translucent and substantially parallel with one another. A cavity 18 is defined between the first and second plates 14, 16. A partially conductive coating 20 is disposed on at least a portion of the first and second plates 14, 16 proximate the cavity 18. A cam mechanism 22 is operably coupled with the second plate 16, wherein the cam mechanism 22 is configured to move the second plate 16 between a cooking position 24 and a non-cooking position 26. A user interface 28 is accessible from an exterior side 30 of an at least partially translucent outer plate 32 disposed distal from the cavity 18 and proximate at least one of the first and second plates 14, 16. The user interface 28 is in electrical communication with the partially conductive coating 20, wherein the partially conductive coating 20 is in thermal communication with the cavity 18.

Referring again to FIGS. 1-3, the base of the cooking appliance 10 is substantially rectangular, and is configured to house various electrical supply components 36 of the cooking appliance 10 that provide electrical power to the heating elements of the cooking appliance 10, as will be described more fully below. A plurality of feet 52 are disposed on an underside 54 of the base 50, and provides support for the cooking appliance 10 and substantially prevent slippage of the cooking appliance 10 while positioned on a countertop. The housing 12 of the cooking appliance 10 includes an inner frame 56 having two vertical framing members 58, and a horizontal framing member 60 extending therebetween. Slots 62 are disposed in the vertical framing members 58 and are configured to receive various operable aspects of the cooking appliance 10 wherein the slots 62 allow for movement of various operable mechanisms within the inner frame 56 while also being supported by the inner frame 56. Inner frame guides 64 are disposed proximate each of the vertical framing members 58 to support the various operable mechanisms. These various operable mechanisms of the cooking appliance 10 include a vertically operable post 66 and a pair of ramp members 68 whose movement is configured to secure and support food items 34 placed within the cavity 18 of the housing 12, as will be more fully described below. The inner frame 56 can be made of various rigid materials that can include, but are not limited to, stainless steel, steel, aluminum, alloys thereof, or combinations thereof.

As shown in FIGS. 3-6, the housing 12 includes an exterior frame 80 including a lower framing member 82 disposed proximate a rotating hinge mechanism 84 wherein the lower framing member 82 is configured to rotate within a recess 86 disposed on an upper surface 88 of the base 50. The exterior frame 80 of the housing 12 also includes an upper framing member 90 that defines an access aperture 92 configured to provide access into the cavity 18 of the housing 12. The upper framing member 90 also includes a handle receptacle 94 configured to receive a handle 96 of the first plate 14, wherein the handle 96 allows the user to slidably operate the first plate 14 between an inserted position 98 within the cavity 18 of the housing 12 and an extended position 100 (as shown in FIG. 7) where the first plate 14 is at least partially removed from the cavity 18. To allow removal of the first plate 14, the upper framing member 90 also includes a plate receptacle formed as part of the access aperture 92, wherein the plate receptacle includes aperture extensions 102 that extend the length of at least a portion of the access aperture 92. The various plates of the cooking appliance 10 are disposed between the inner frame 56 and the upper framing member 90, and, with the exception of the first plate 14, are secured therein by the inner frame 56 in the upper framing member 90.

The exterior frame 80 of the housing 12 also includes first and second end caps 104, 106 that are configured to be disposed on left and right sides 108, 110, respectively, of the housing 12. The end caps 104, 106 extend over end portions 112 of the lower and upper framing members 82, 90 of the exterior frame 80 of the housing 12. In this manner, the end caps 104, 106 substantially secure the lower and upper framing members 82, 90 and the inner frame 56 in a substantially fixed position relative to one another, thereby also substantially securing the various plates, including the first and second plates 14, 16, within the housing 12.

In various embodiments, the exterior frame 80 of the housing 12 and the base 50 of the cooking appliance 10 can be made of different materials including, but not limited to, stainless steel, aluminum, steel alloys, aluminum alloys, plastic, ceramic, combinations thereof, or other substantially rigid materials. In various embodiments, the exterior surface 114 of the housing 12 can be painted a variety of colors, depending upon the needs and/or preferences of the user.

Figure 4:
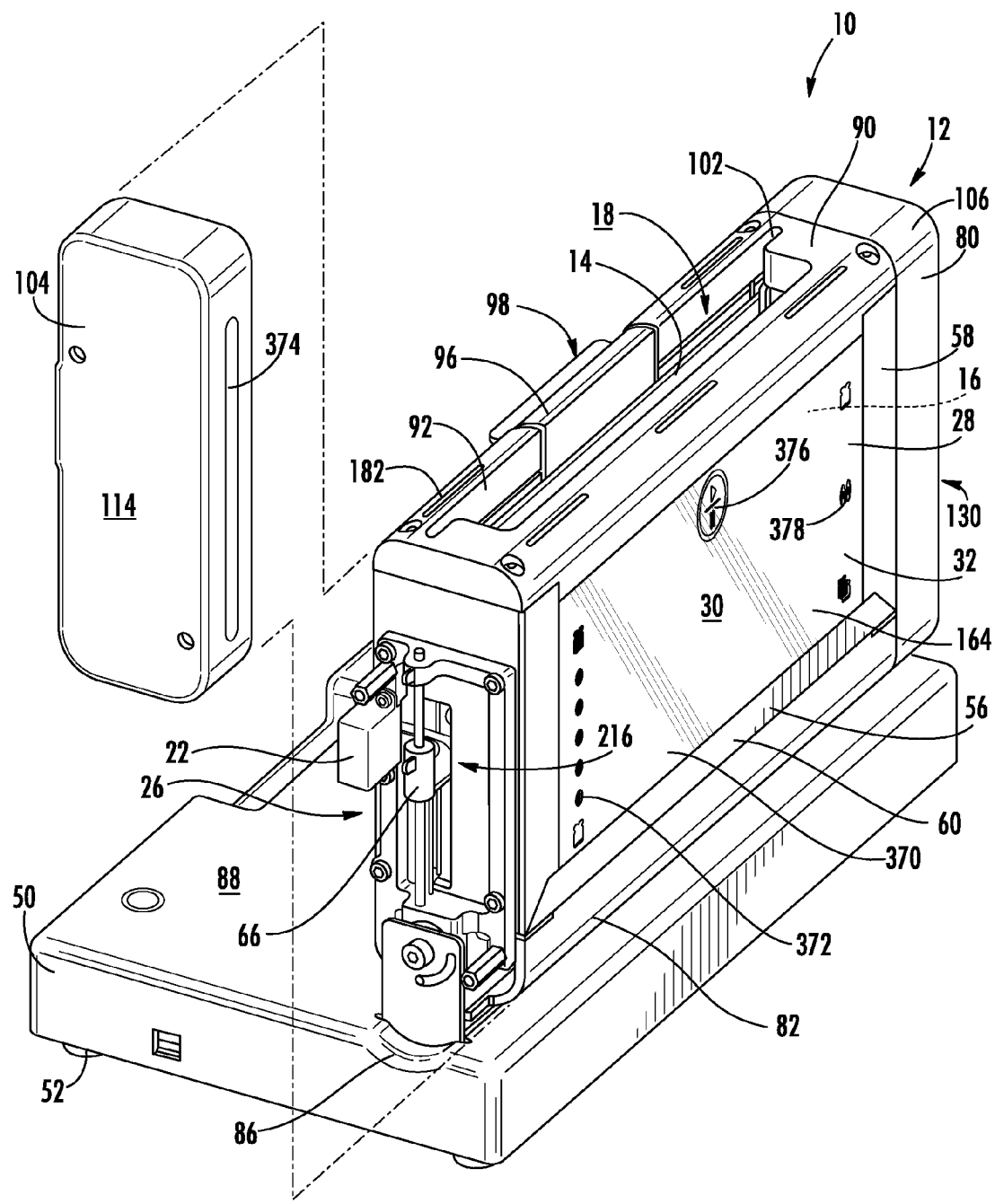
FIG. 4 is a partially exploded view of the cooking appliance of FIG. 1, with the end cap removed.
Figure 5:
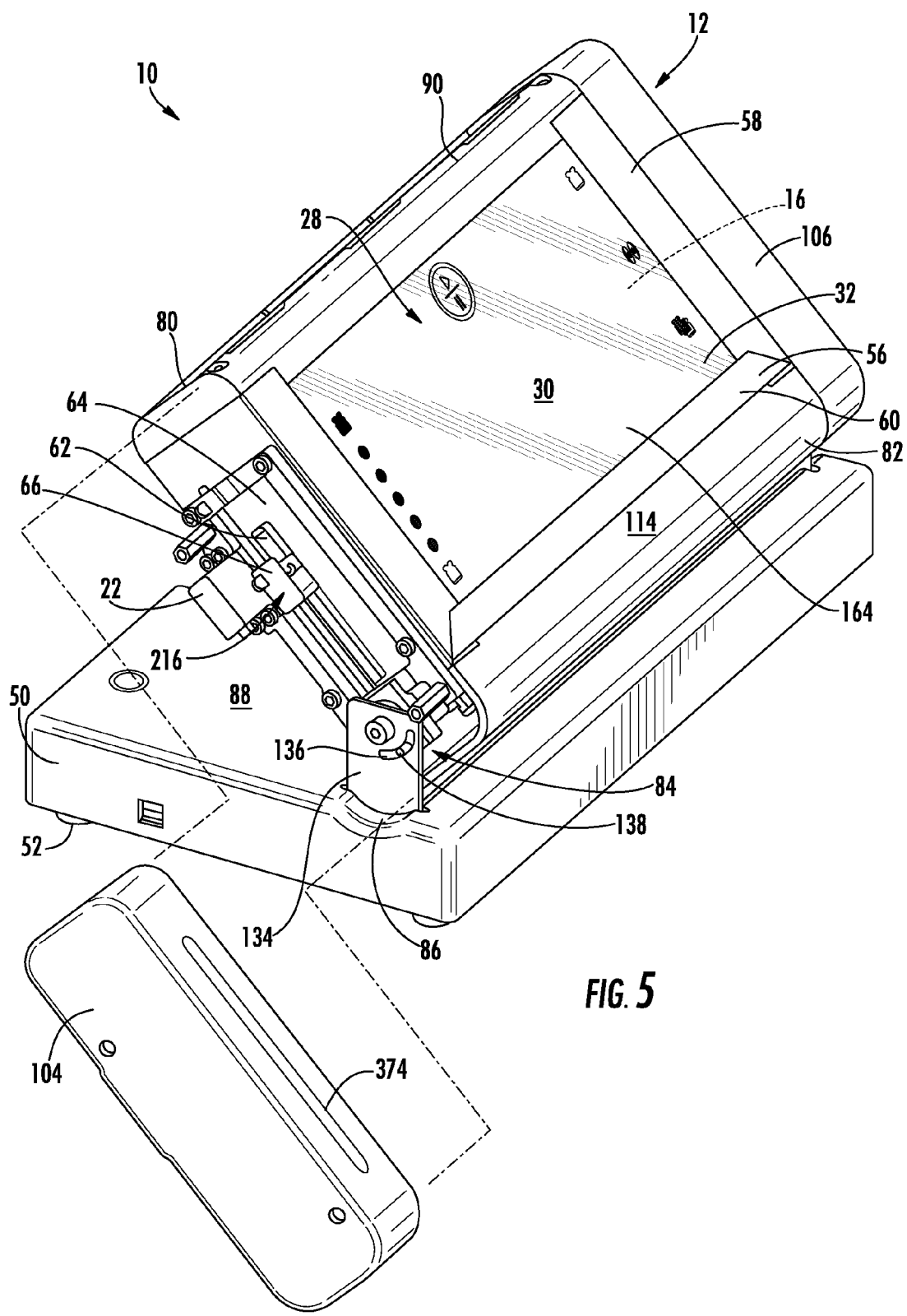
FIG. 5 is a partially exploded perspective view of the cooking appliance of FIG. 4, with the housing in a partially rotated position.
Figure 6:
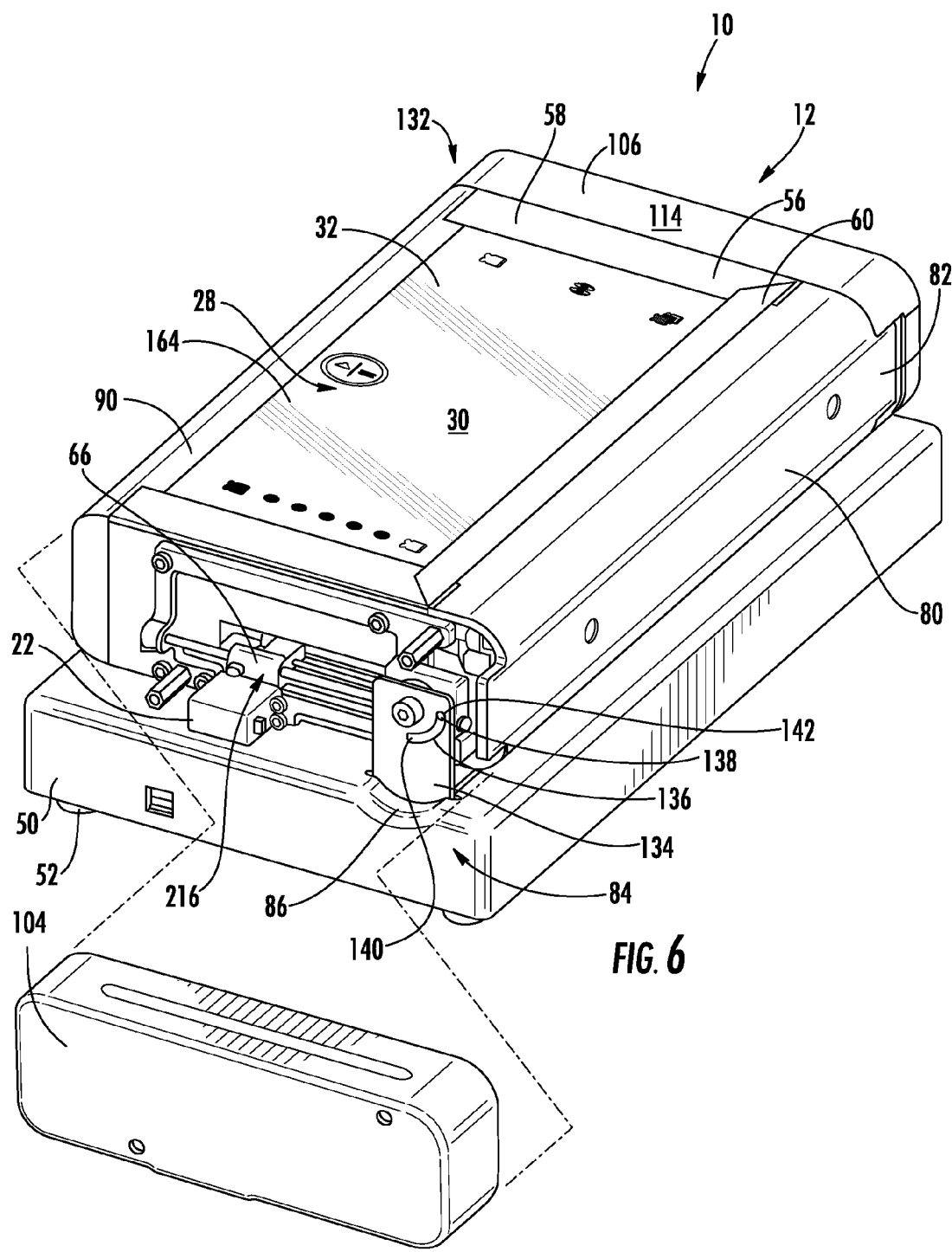
FIG. 6 is a partially exploded perspective view of the cooking appliance of FIG. 4, with the housing in the horizontal position.
Figure 7:
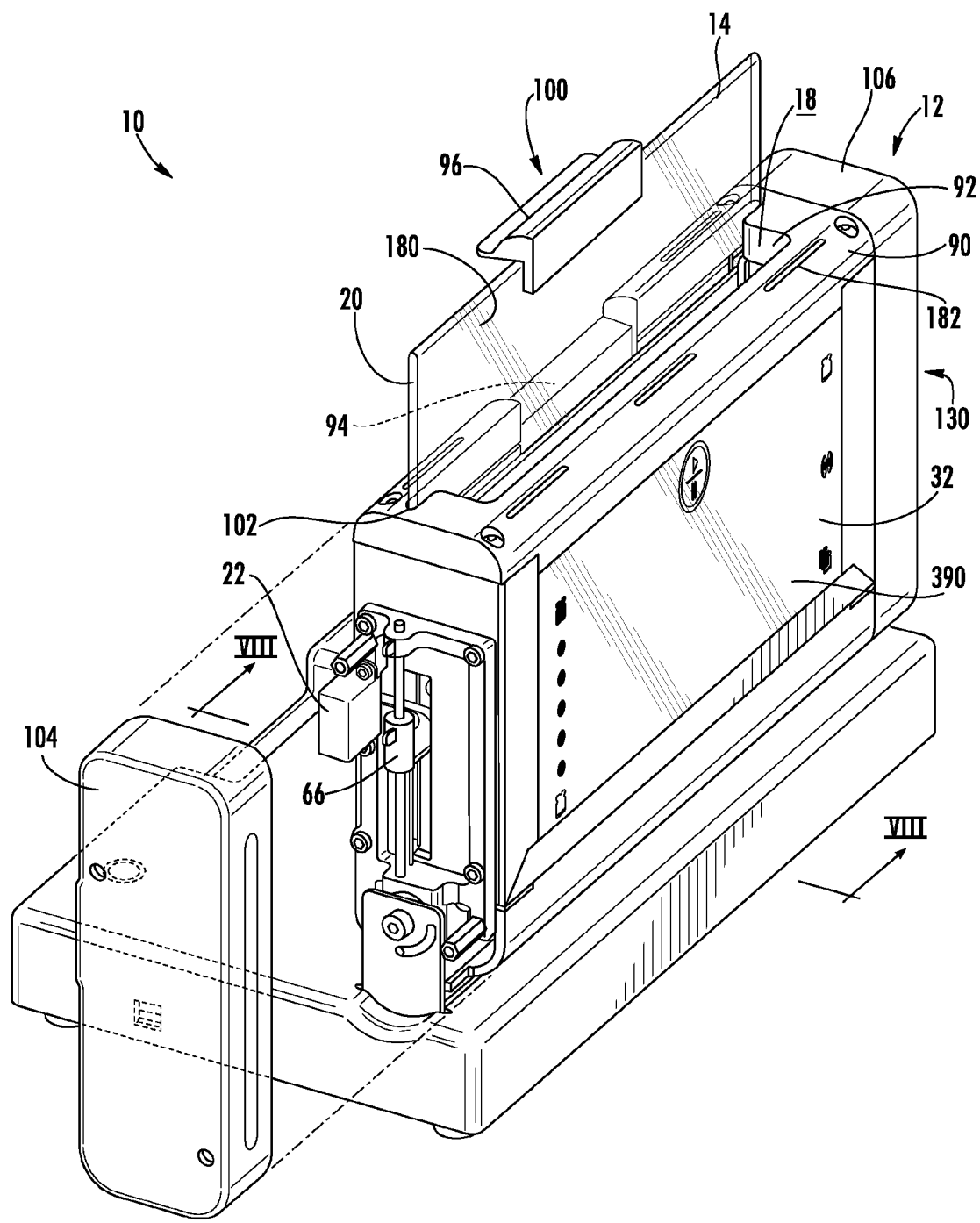
FIG. 7 is a partially exploded perspective view of an alternate embodiment of the cooking appliance with the end cap removed and one of the plates in an extended position.

As illustrated in FIGS. 4-6, the housing 12 rests upon the base 50 and is pivotally coupled thereto. The housing 12 is operable between vertical and horizontal positions 130, 132. In various embodiments, the rotating hinge mechanism 84 enables the housing 12 to pivot between the vertical and horizontal positions 130, 132. The rotating hinge mechanism 84 can include one or more support plates 134 extending from the base 50 and disposed proximate the left and right sides 108, 110 of the housing 12. Each of the support plates 134 define a groove 136 within which a swivel pin 138 or shoulder bolt is received such that the swivel pin 138 or shoulder bolt moves within the groove 136 to guide the housing 12 between the vertical and horizontal positions 130, 132. At a first groove end 140, the groove 136 defines a vertical locking area that is configured to receive the swivel pin 138 and to selectively secure the housing 12 within the vertical position 130. A second groove end 142 defines a horizontal locking area configured to receive the swivel pin 138 and selectively secure the housing 12 within the horizontal position 132. A biasing member, such as a wave spring, can be disposed within the rotating hinge mechanism 84 to provide a resistive force as the housing 12 is moved between the vertical and horizontal positions 130, 132. A recess 86 disposed in the upper surface 88 of the base 50 allows the housing 12 to rotate between the vertical and horizontal positions 130, 132, while maintaining a minimal gap between the housing 12 and the base 50.

Figure 8:
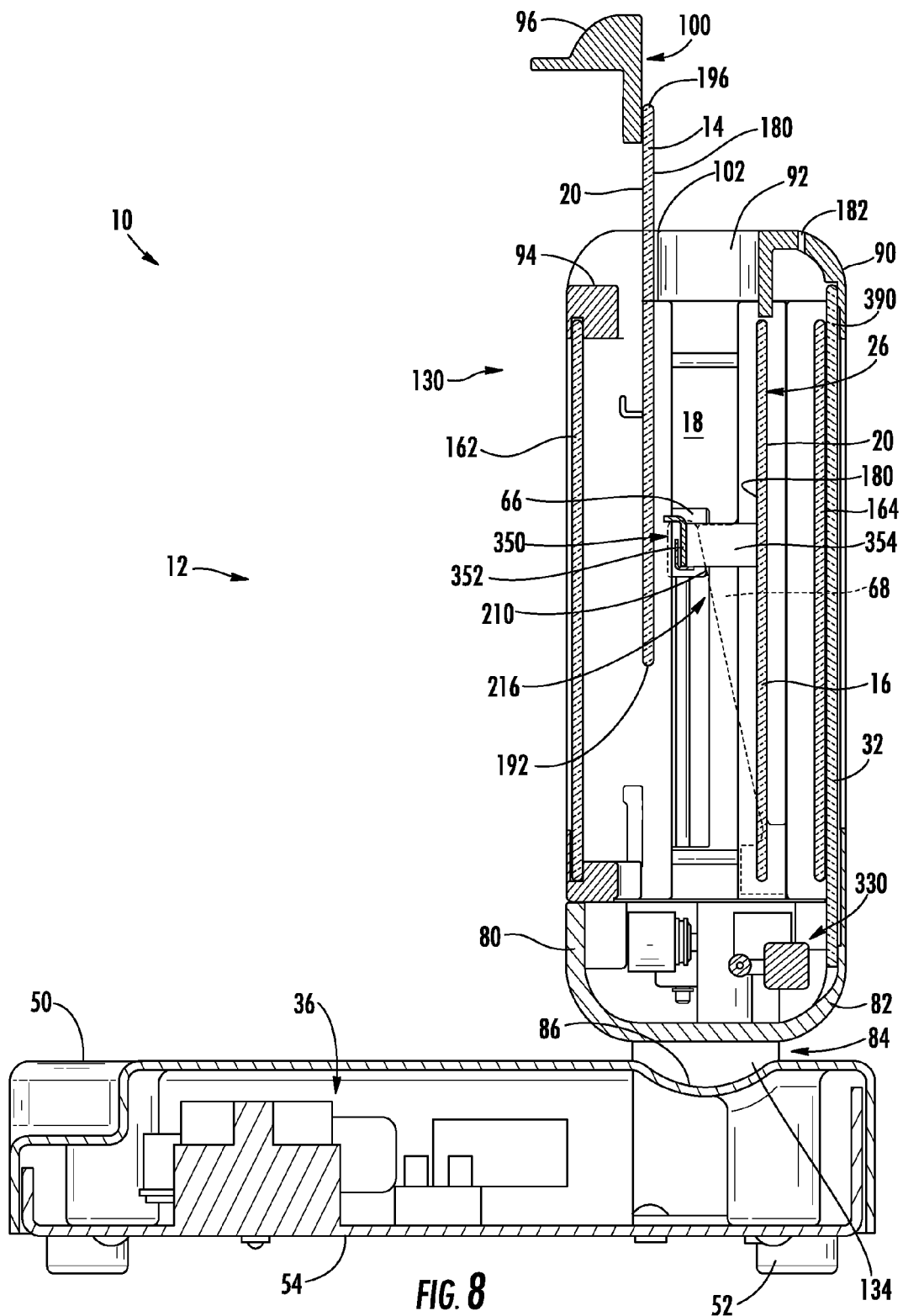
FIG. 8 is a cross-sectional view of the cooking appliance of FIG. 7, taken along line VII-VII.

As illustrated in FIGS. 7-8, the cavity 18 of the housing 12 is externally accessible through the access aperture 92 defined by the upper framing member 90 of the housing 12, wherein the access aperture 92 is disposed proximate the first and second plates 14, 16 in an operable communication with the cavity 18. The access aperture 92 is configured to receive various food items 34, such that the food items 34 can be placed within the externally accessible cavity 18 for cooking. In this manner, when the housing 12 is disposed in the vertical position 130, various bread products, such as bread slices, bagels, pastries, and the like, can be placed into the externally accessible cavity 18 in the manner substantially similar to a toaster.

Figure 9:
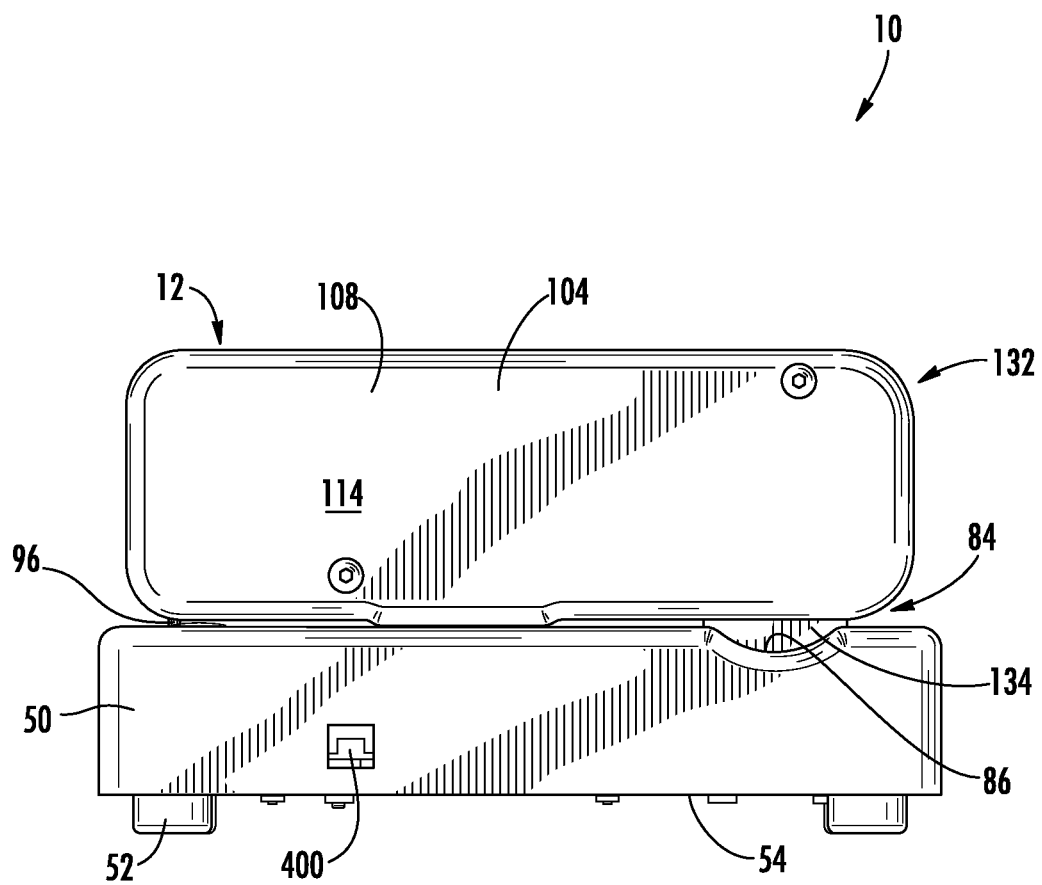
FIG. 9 is a first side view of an alternate embodiment of the cooking appliance, with the housing in the horizontal position.
Figure 10:
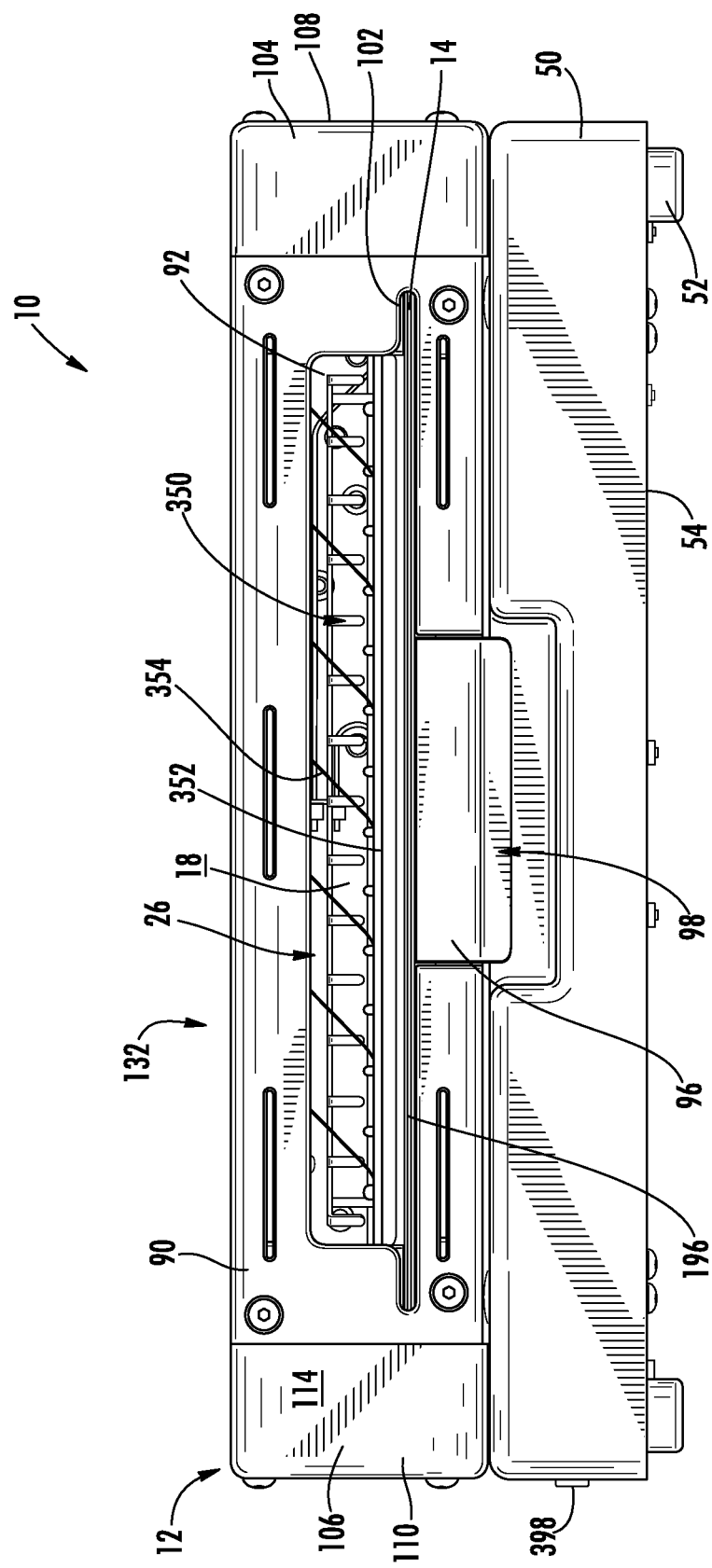
FIG. 10 is a second side view of the cooking appliance of FIG. 9.
Figure 11:
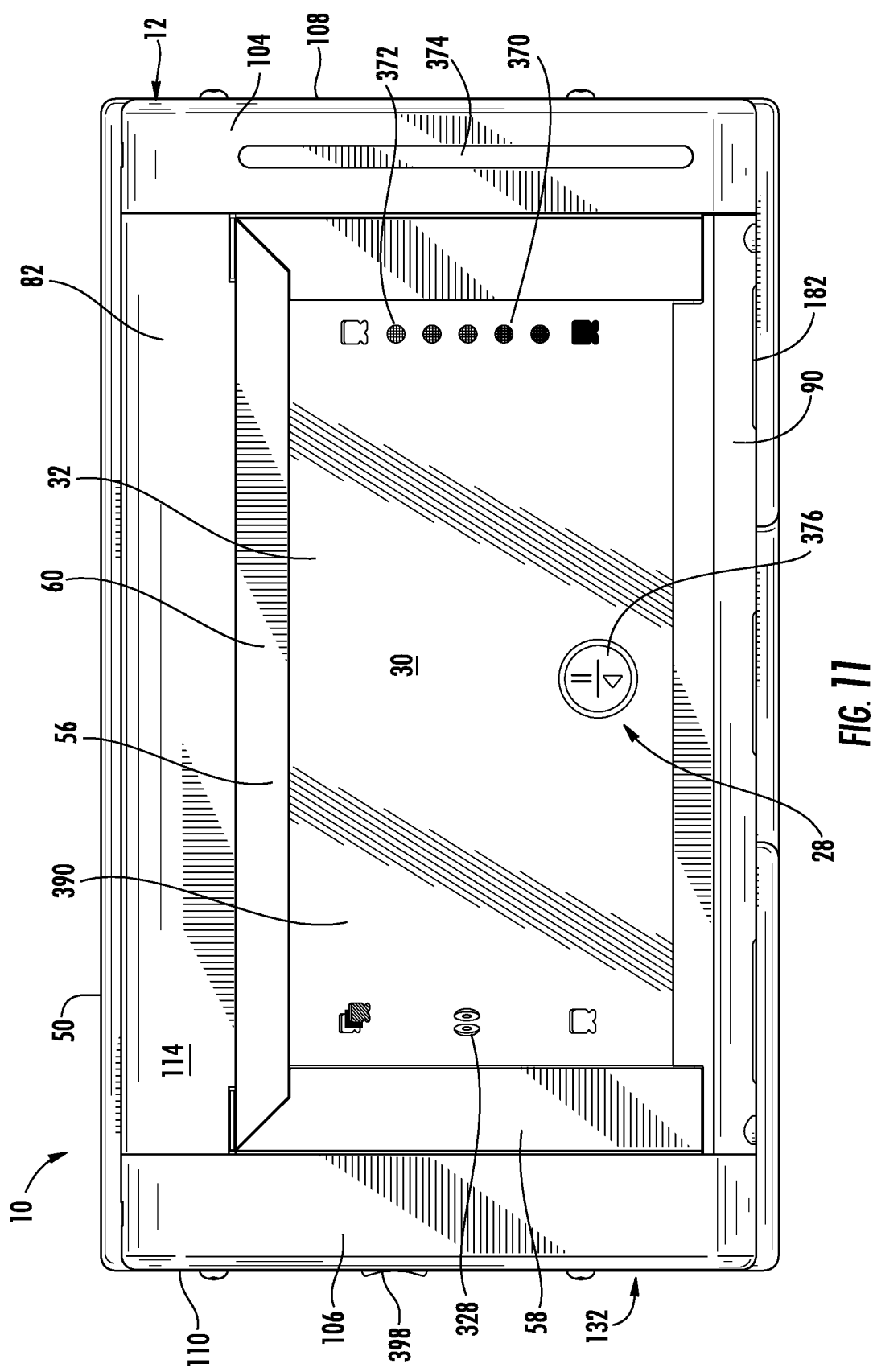
FIG. 11 is a top plan view of the cooking appliance of FIG. 9.

As illustrated in FIGS. 9-11, when the housing 12 of the cooking appliance 10 is disposed in the horizontal position 132, the externally accessible cavity 18 is configured to receive stacked food items 34 such as sandwiches, paninis, wraps, and the like, that are more conveniently cooked by a horizontally oriented apparatus. It should be understood that any food item 34 that can be cooked within the externally accessible cavity 18 when the housing 12 is in the vertical position 130 can also be cooked within the externally accessible cavity 18 when the housing 12 is in the horizontal position 132, and vice versa.

Referring again to FIG. 8, the first and second plates 14, 16 are partially coated with an electrically resistive coating 20 that is also at least partially conductive. The coating 20 is an at least partially translucent thin film deposit that is disposed on the outer surfaces 160 of the first and second plates 14, 16. In this manner, the coating 20 is disposed outside of the cavity 18. Outer plates 32 are disposed proximate the first and second plates 14, 16 of the housing 12, including third and fourth plates 162, 164, respectively. The coating 20 disposed on the first plate 14 is positioned between the first and third plates 14, 162, and the coating 20 disposed on the second plate 16 is positioned between the second and fourth plates 16, 164. The third and fourth plates 162, 164 are at least partially translucent. In this manner, the plates of the cooking appliance 10 cooperate to form a translucent window in the housing 12.

As illustrated in FIGS. 13-18, the first, second, third and fourth plates 14, 16, 162, 164 are substantially transparent, such that a user of the cooking appliance 10 can view the cavity 18 through either the third or fourth plates 162, 164 of the housing 12. In this manner, the user is able to view food items 34 placed within the cavity 18 and visually assess the cooking progress of the food item 34 without removing the food item 34 from the cavity 18. Additionally, the user of the cooking appliance 10 is able to determine the appropriate level of browning of the food item 34 during the cooking process and, if necessary, stop the cooking process short when the appropriate level of browning is achieved.

In various embodiments, the partially conductive coating 20 is tin oxide. When electrical power is distributed to the first and second plates 14, 16, an electrical current is distributed through the partially conductive coating 20. The coating 20, also being electrically resistive, emits heat as the electrical current runs through the coating 20. In this manner, the heat emitted from the coating 20, as a result of the electrical current, is received by the first and second plates 14, 16, such that the first and second plates 14, 16 are heated. The heat emitted by the coating 20 is transferred through the first and second plates 14, 16 and into the cavity 18, such that inner surfaces 180 of the first and second plates 14, 16 are configured to be heating elements for the cooking appliance 10. As the level of electric current that is passed through the coating 20 is increased, the amount of heat emitted by the coating 20 is also increased, thereby increasing the temperature of the first and second plates 14, 16 such that the temperature of the cavity 18 is also increased.

Referring again to FIGS. 1-3 and 8, the third and fourth plates 162, 164 are configured to substantially prevent access to the coating 20 disposed on the outer surfaces 160 of the first and second plates 14, 16. In this manner, the third and fourth plates 162, 164 protect the coating 20 from damage that may be caused by the user or some object scratching the outer surfaces 160 of the first and second plates 14, 16 on which the coating 20 is disposed.

In the various embodiments, the coating 20, in addition to being partially conductive, is also a heat reflective material. In this manner, as the first and second plates 14, 16 receive heat from the selectively electrified tin oxide coating 20, the coating 20 serves to reflect heat that may be emitted away from the cavity 18, back toward the first and second plates 14, 16 and into the cavity 18. Accordingly, during operation of the cooking appliance 10, as the cavity 18 receives heat from the first and second plates 14, 16, the third and fourth plates 162, 164 maintain a lower temperature than the first and second plates 14, 16. In this manner, heat from the first and second plates 14, 16 that may have been lost through the outer surfaces 160 of the first and second plates 14, 16 is reflected into the cavity 18 by the tin oxide coating 20, thereby allowing the cooking appliance 10 to operate in a more efficient manner. Heat that may build up in the interstitial spaces between the first and third plates 14, 162 and the second and fourth plates 16, 164 is permitted to escape through vents 182 defined in the upper framing member 90. It should be understood that alternate materials can be used as the coating 20, wherein such materials can include, but are not limited to, indium tin oxide, zinc oxide or other partially conductive and heat reflective coatings.

Figure 3:
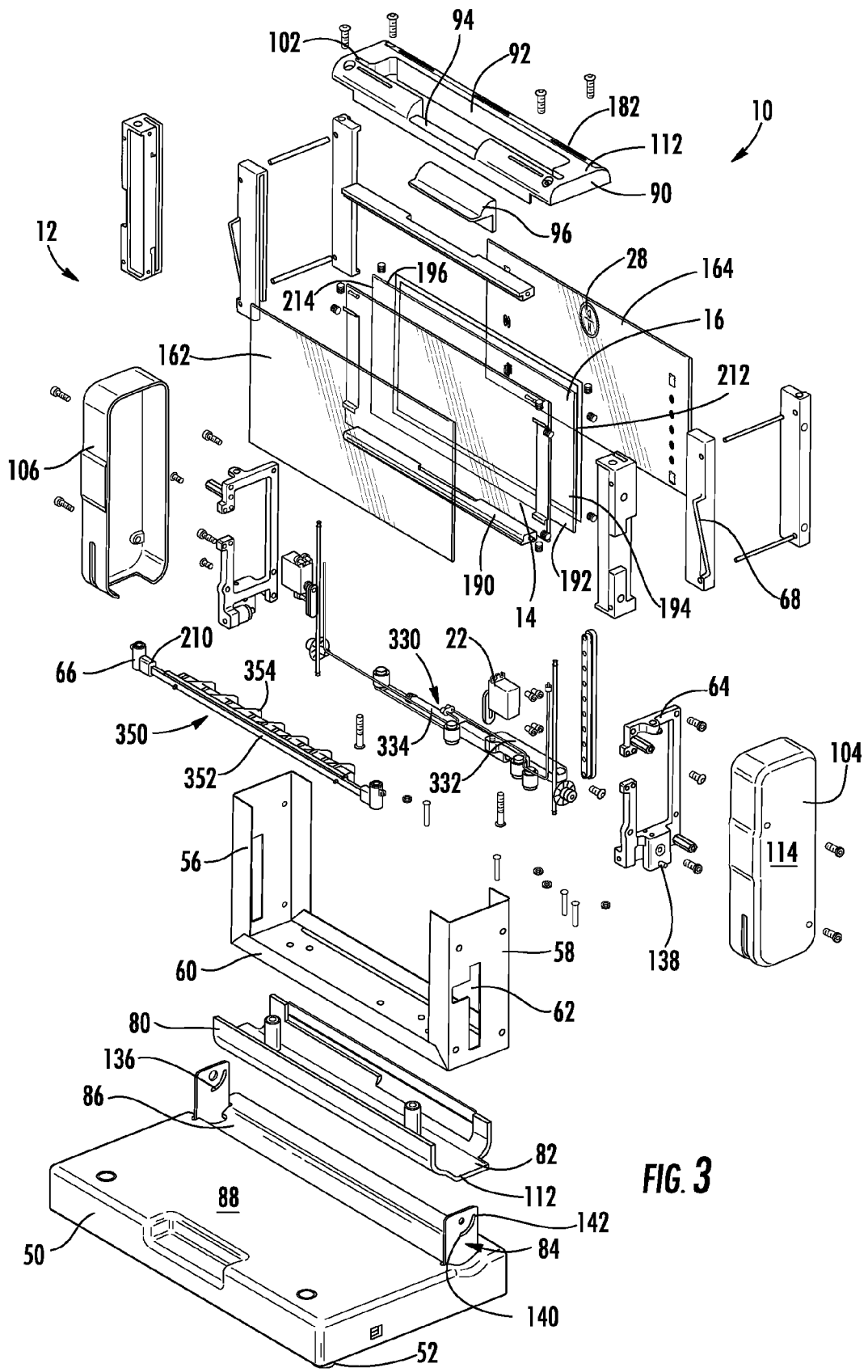
FIG. 3 is an exploded perspective view of the cooking appliance of FIG. 1.

As illustrated in FIGS. 3 and 8, electrical power is delivered to the first and second plates 14, 16 through bus bars 190 coupled to the first and second plates 14, 16. The bus bars 190 can be made of various conductive materials that can include, but are not limited to, silver, copper, or other at least partially conductive material. As electricity is delivered to the bus bars 190, the bus bar 190, being disposed substantially along edges of the first and second plates 14, 16, delivers substantially even levels of electricity through the coatings 20 of the first and second plates 14, 16. The bus bars 190 can be disposed along lower edges 192, side edges 194, top edges 196, or combinations thereof of the first and second plates 14, 16. The bus bars 190 are configured to be in selective electrical communication with the electrical supply components 36 disposed within the base 50 of the cooking appliance 10.

In various embodiments, the first, second, third and fourth plates 14, 16, 162, 164 can be made of glass or other at least partially translucent material, including, but not limited to, soda lime, borosilicate, translucent ceramic or other translucent material that is able to be used as a heating element as described above. The first, second, third and fourth plates 14, 16, 162, 164 can range from partially translucent to substantially transparent in appearance.

In various embodiments, additional configurations of plates are also contemplated. Additional plates of glass can be disposed proximate the outer surfaces 160 of the first and/or second plates 14, 16 such that the coating 20 of the first and second plates 14, 16 is disposed between two plates of glass. Alternatively, the first and/or second plates 14, 16 can include a dual pane configuration, where the coating 20 is disposed between the dual panes of the first and/or second plates 14, 16.

Additional substantially translucent insulators can also be disposed proximate the coating 20 of the first and second plates 14, 16 to dispose the coating 20 between the respective first and second plates 14, 16 and an insulating material.

It is also contemplated that the third and fourth plates 162, 164 can include a partially conductive film that can provide selective opacity to the housing 12 as desired to prevent users or other observers from viewing within the housing 12 when various inner parts of the housing 12, such as the first and second plates 14, 16, or other parts, require cleaning. The selective opacity in such an embodiment can be activated by applying a small electrical current to the film applied to a surface of the third and fourth plates 162, 164, wherein the small electrical current rearranges the composition of the film, thereby changing the opacity of the film, and, in turn, the third and fourth plates 162, 164.

Figure 12:
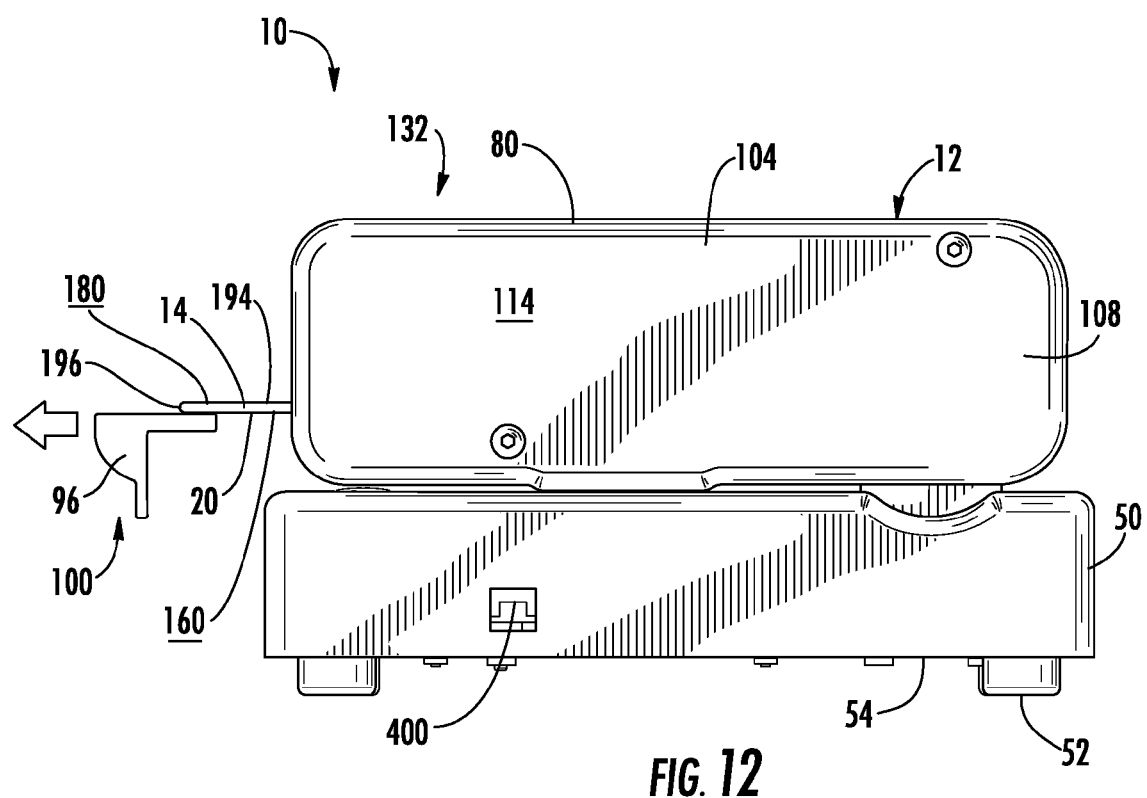
FIG. 12 is a first side view of an alternate embodiment of the cooking appliance with the housing in the horizontal position and one of the plates in an extended position.
Figure 13:
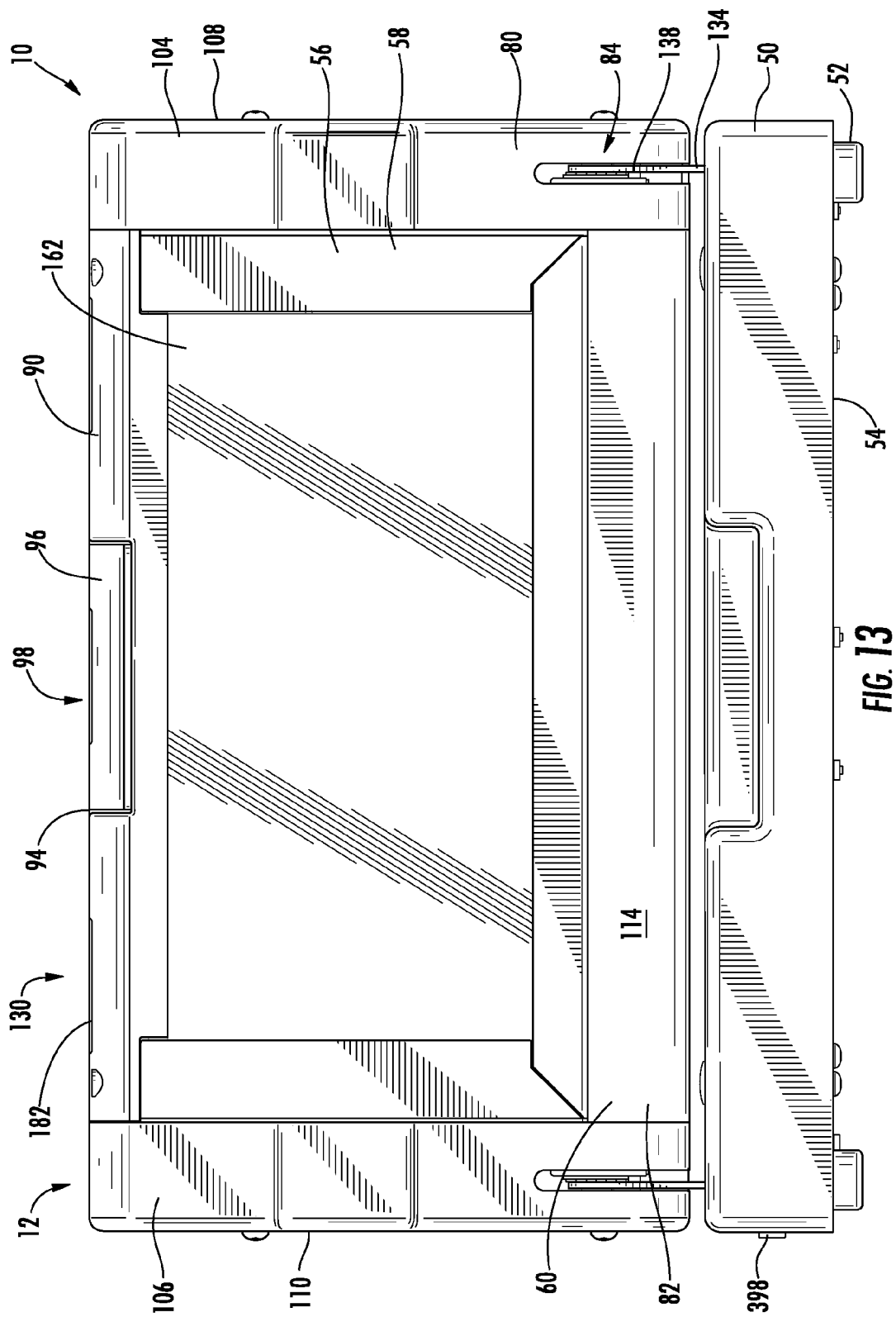
FIG. 13 is a first side view of an alternate embodiment of the cooking appliance with the housing in the vertical position.
Figure 14:
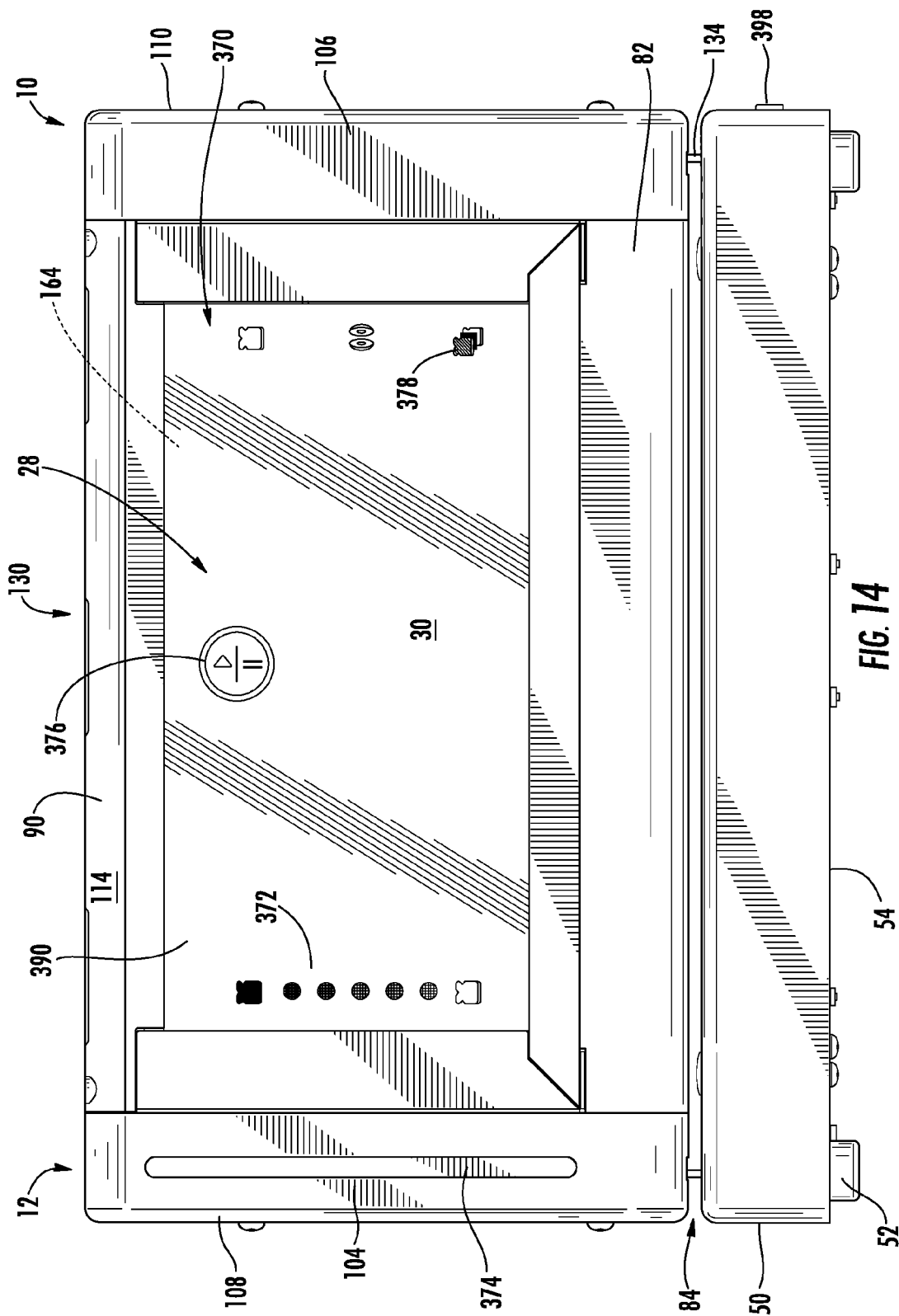
FIG. 14 is a second side view of the cooking appliance of FIG. 13.
Figure 15:
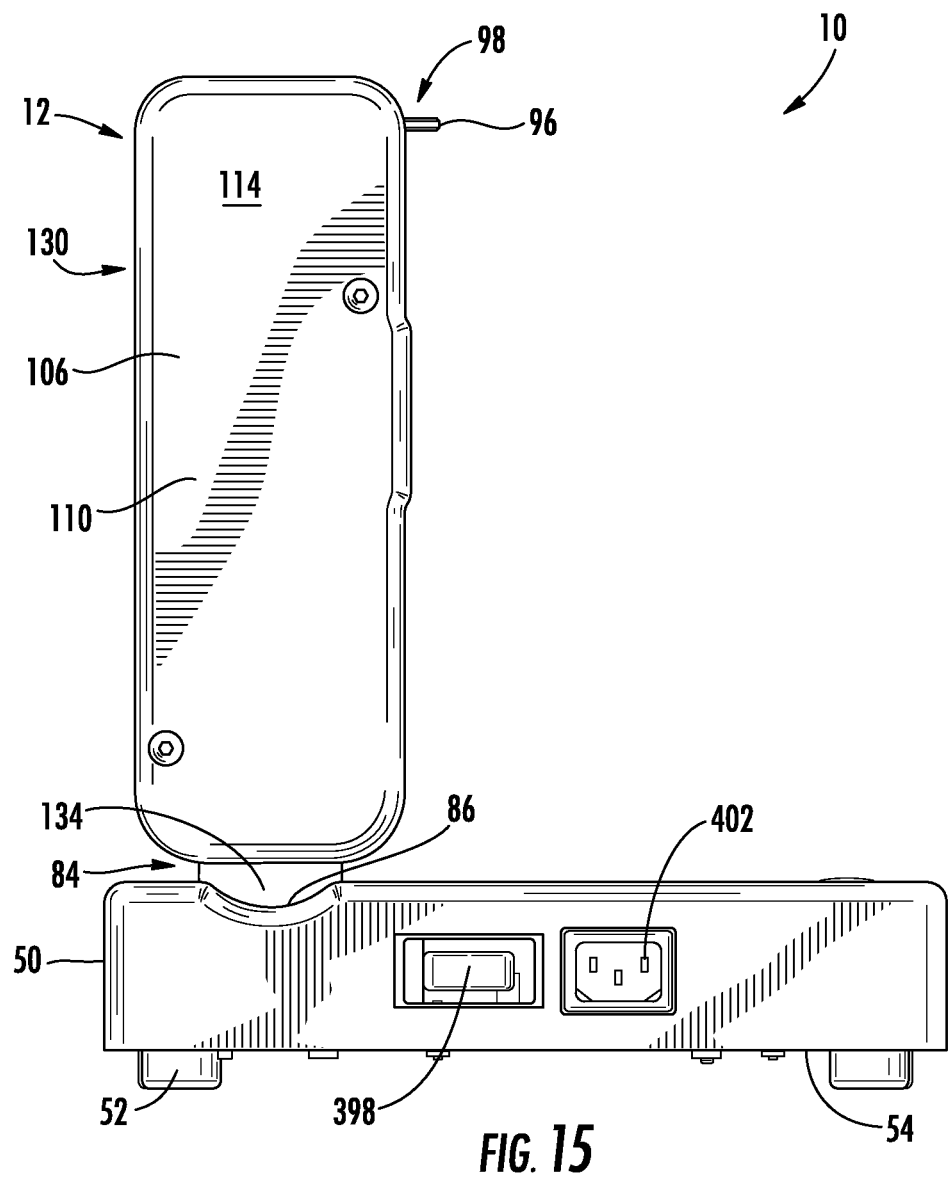
FIG. 15 is a third side view of the cooking appliance of FIG. 13.
Figure 16:
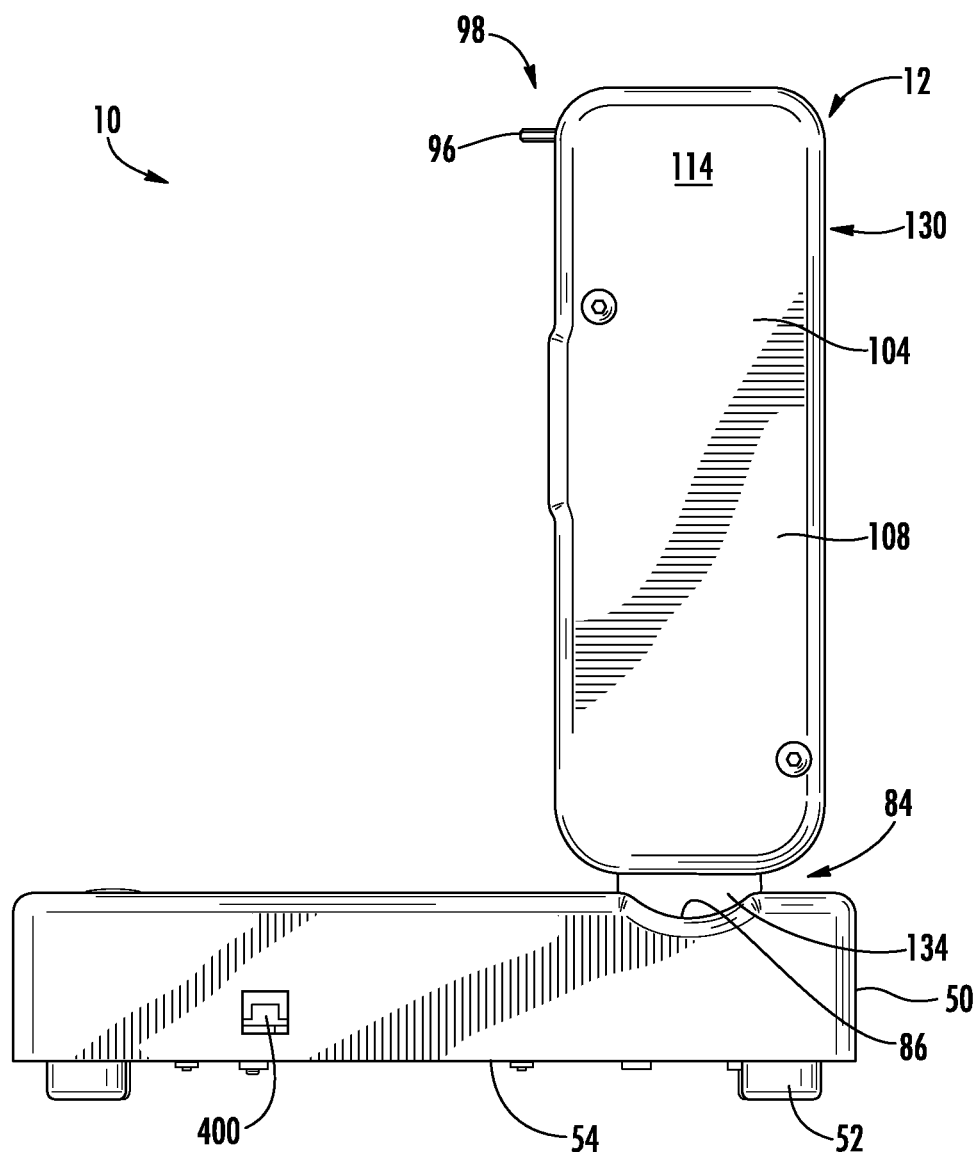
FIG. 16 is a fourth side view of the cooking appliance of FIG. 13.
Figure 17:
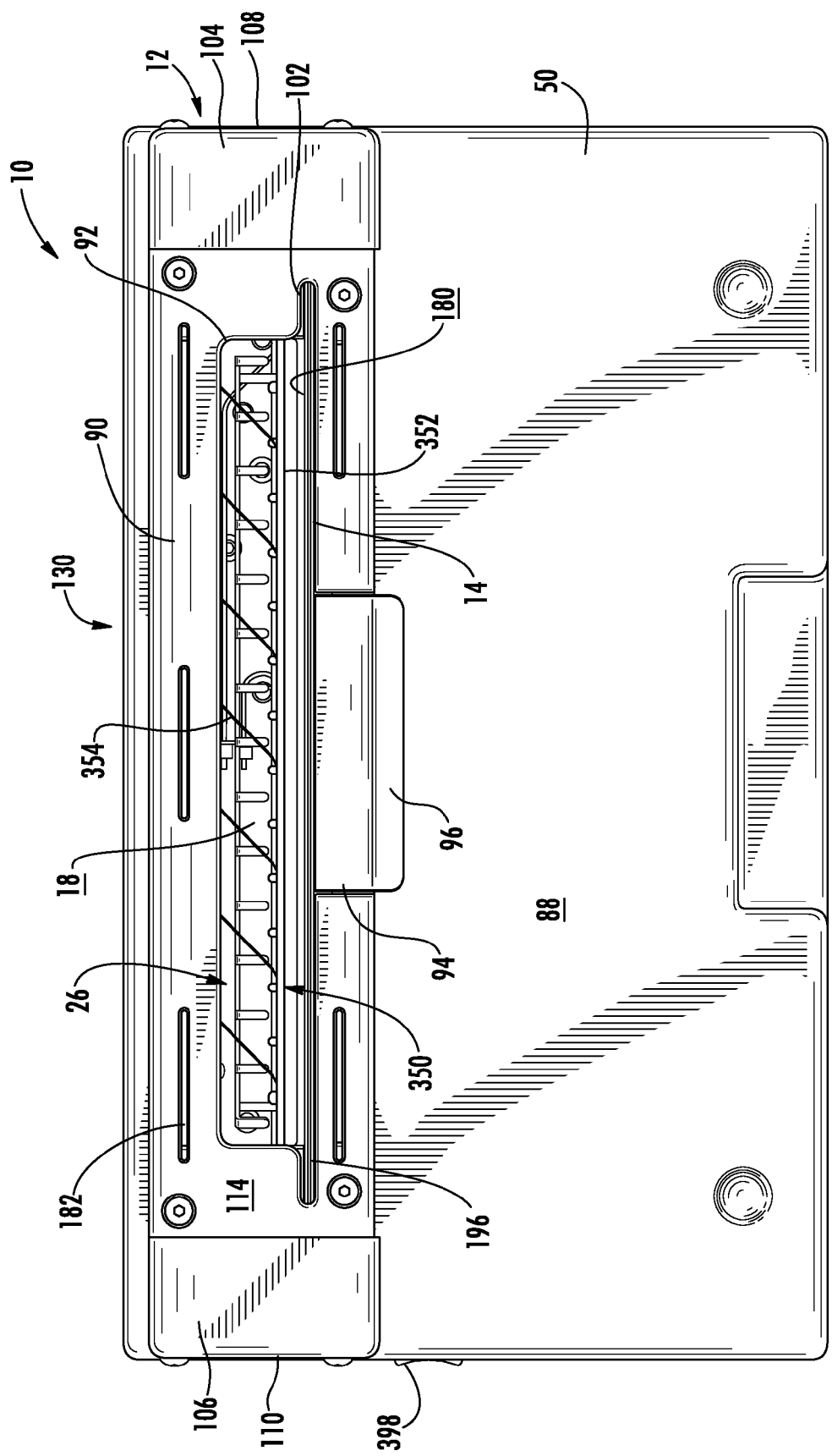
FIG. 17 is a top plan view of the cooking appliance of FIG. 13.
Figure 18:
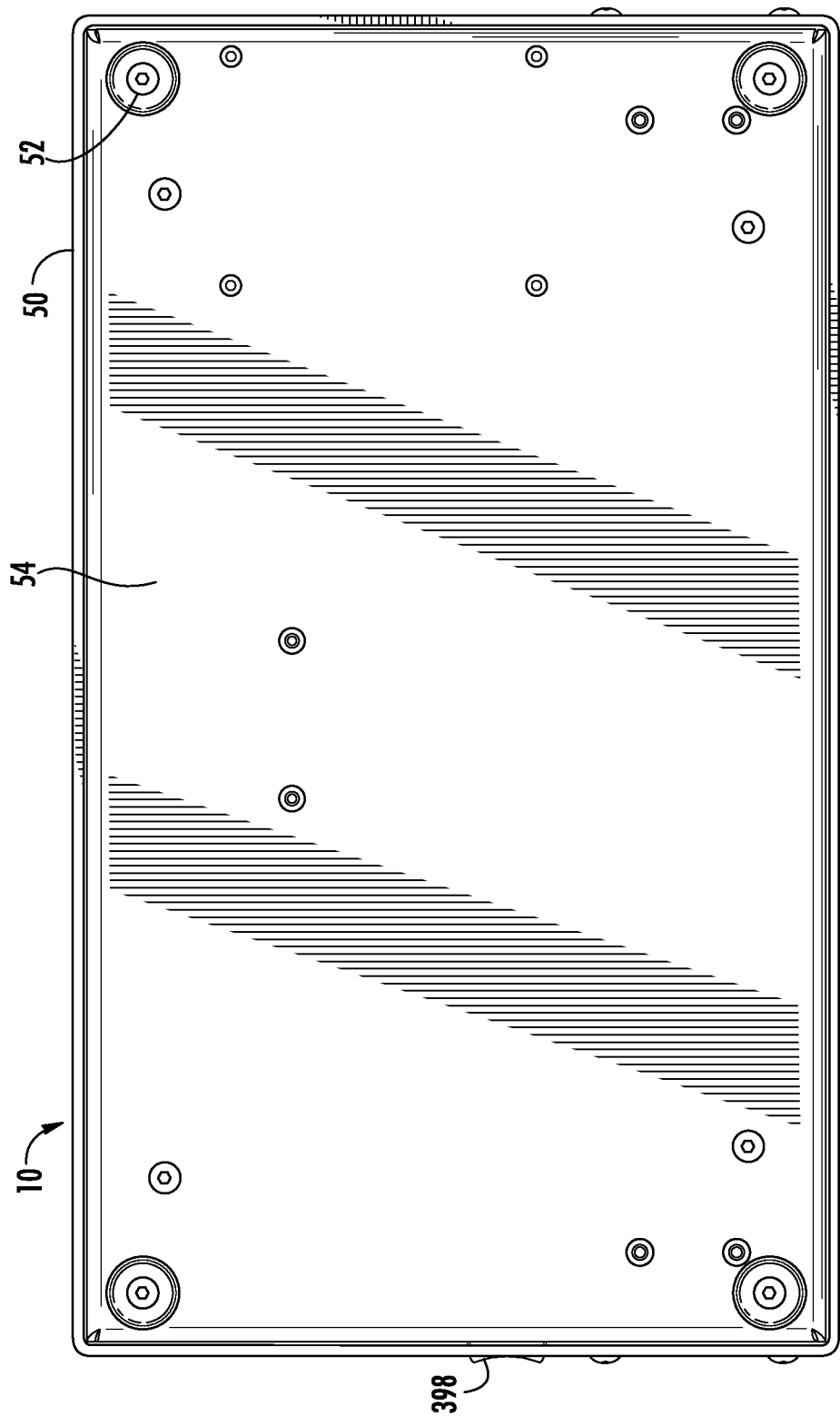
FIG. 18 is a bottom plan view of the cooking appliance of FIG. 13.
Figure 19:
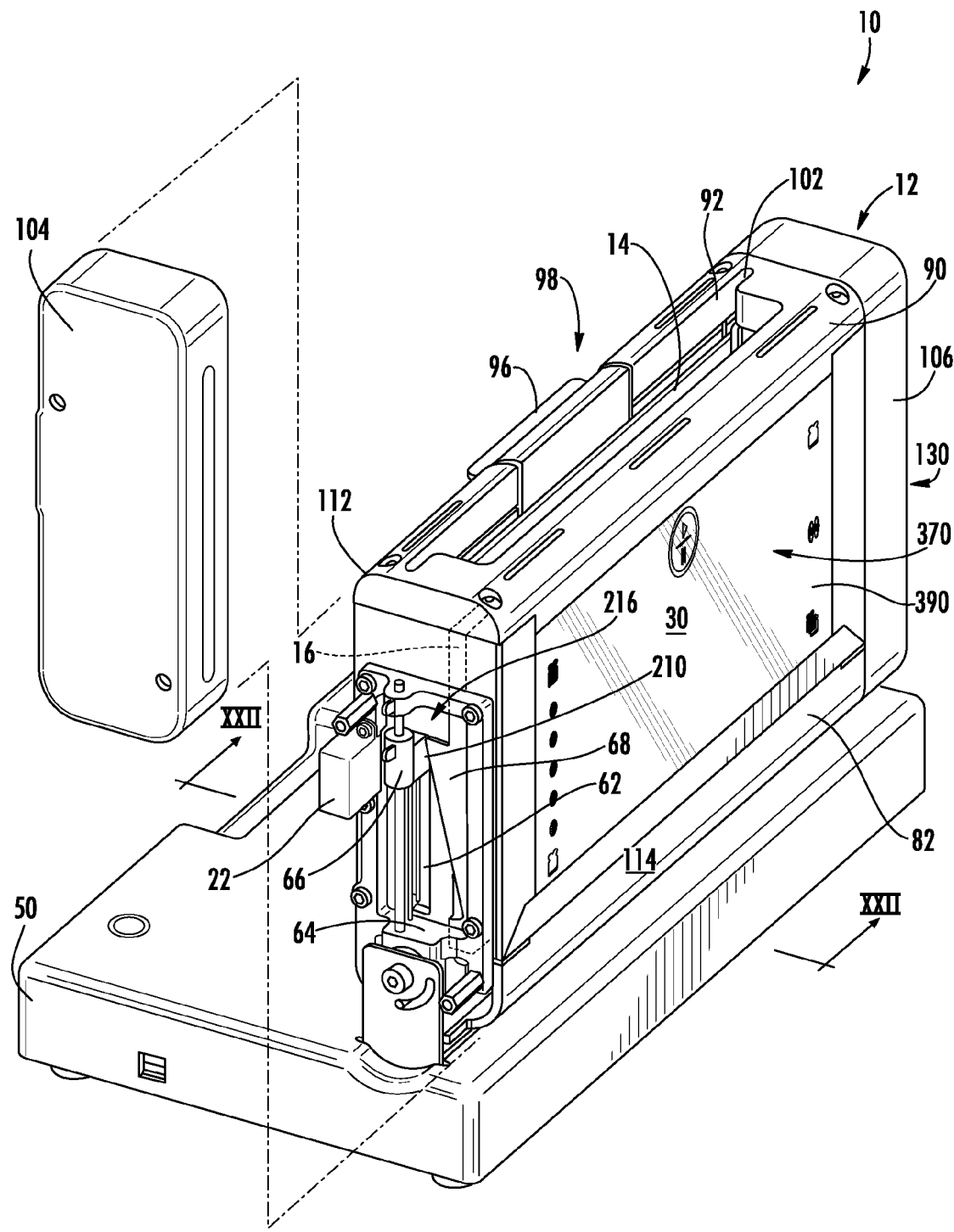
FIG. 19 is a partially exploded perspective view of an alternate embodiment of the cooking appliance with the end cap removed and the vertically operable post in the upper position.
Figure 20:
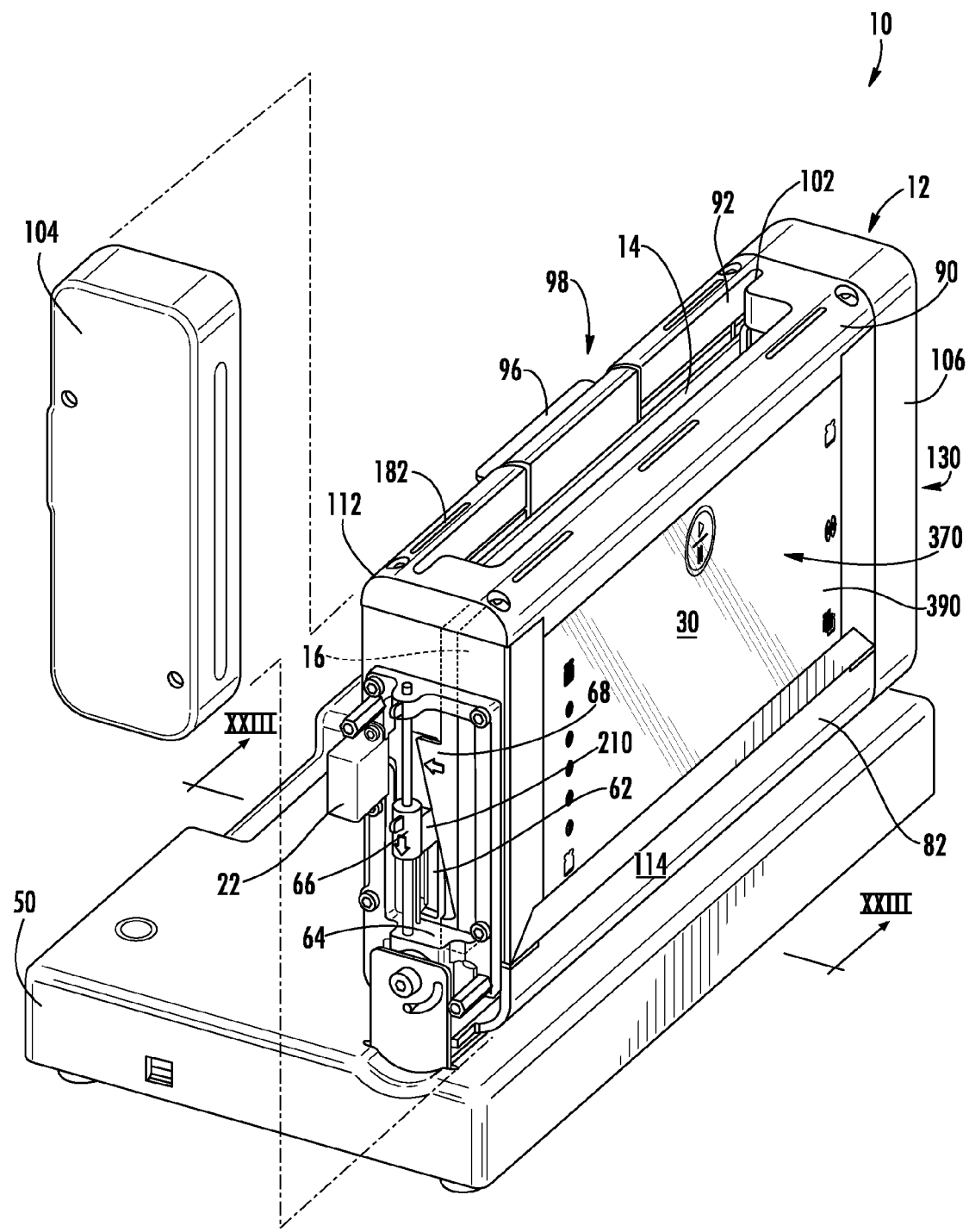
FIG. 20 is a front perspective view of the cooking appliance of FIG. 19, with the vertically operable post moved downward from the upper position.
Figure 21:
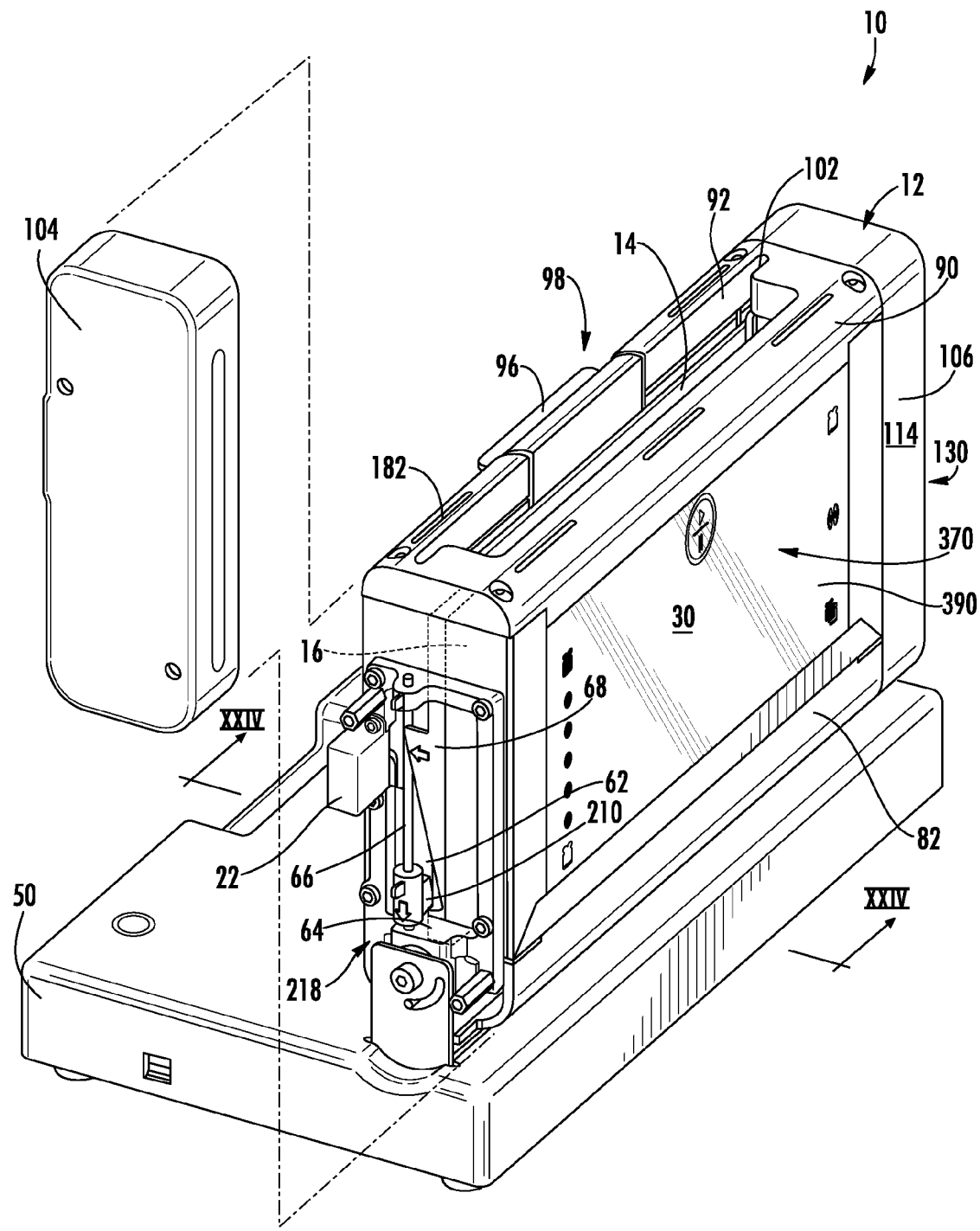
FIG. 21 is a front perspective view of the cooking appliance of FIG. 19, with the vertically operable post in the lower position.
Figure 22:
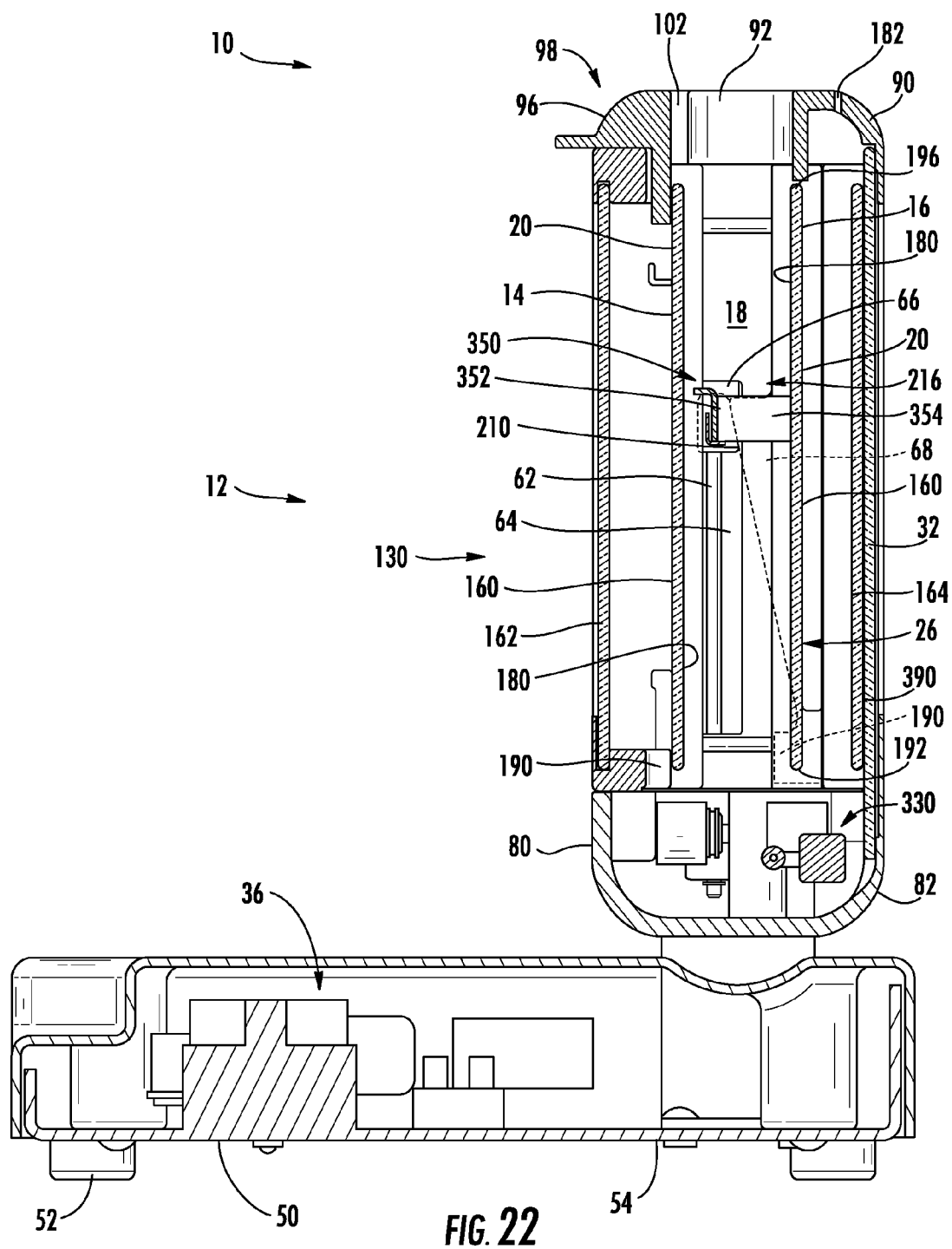
FIG. 22 is a cross-sectional view of the cooking appliance of FIG. 19, taken along line XXII-XXII.
Figure 23:
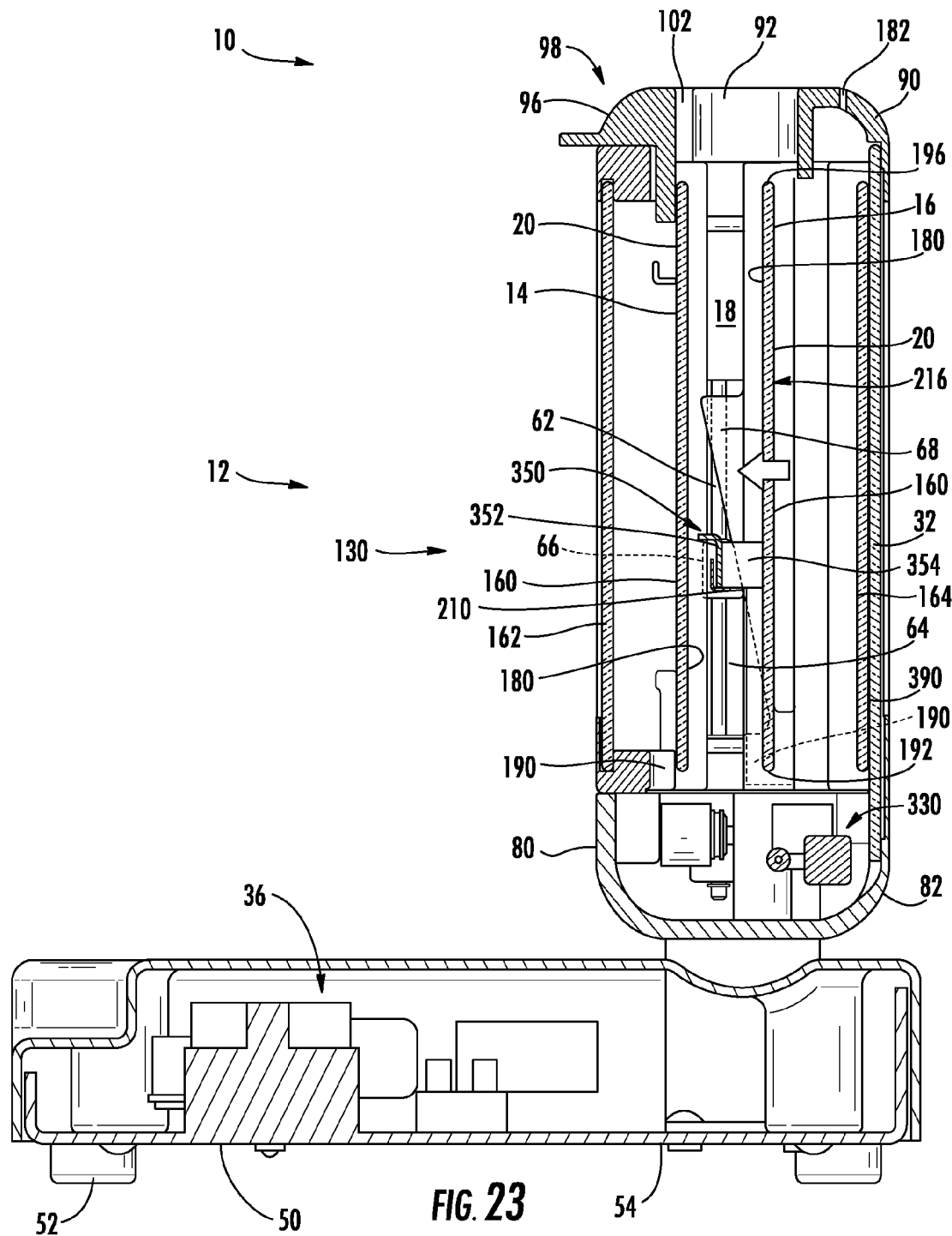
FIG. 23 is a cross-sectional view of the cooking appliance of FIG. 20, taken along line XXIII-XXIII.
Figure 24:
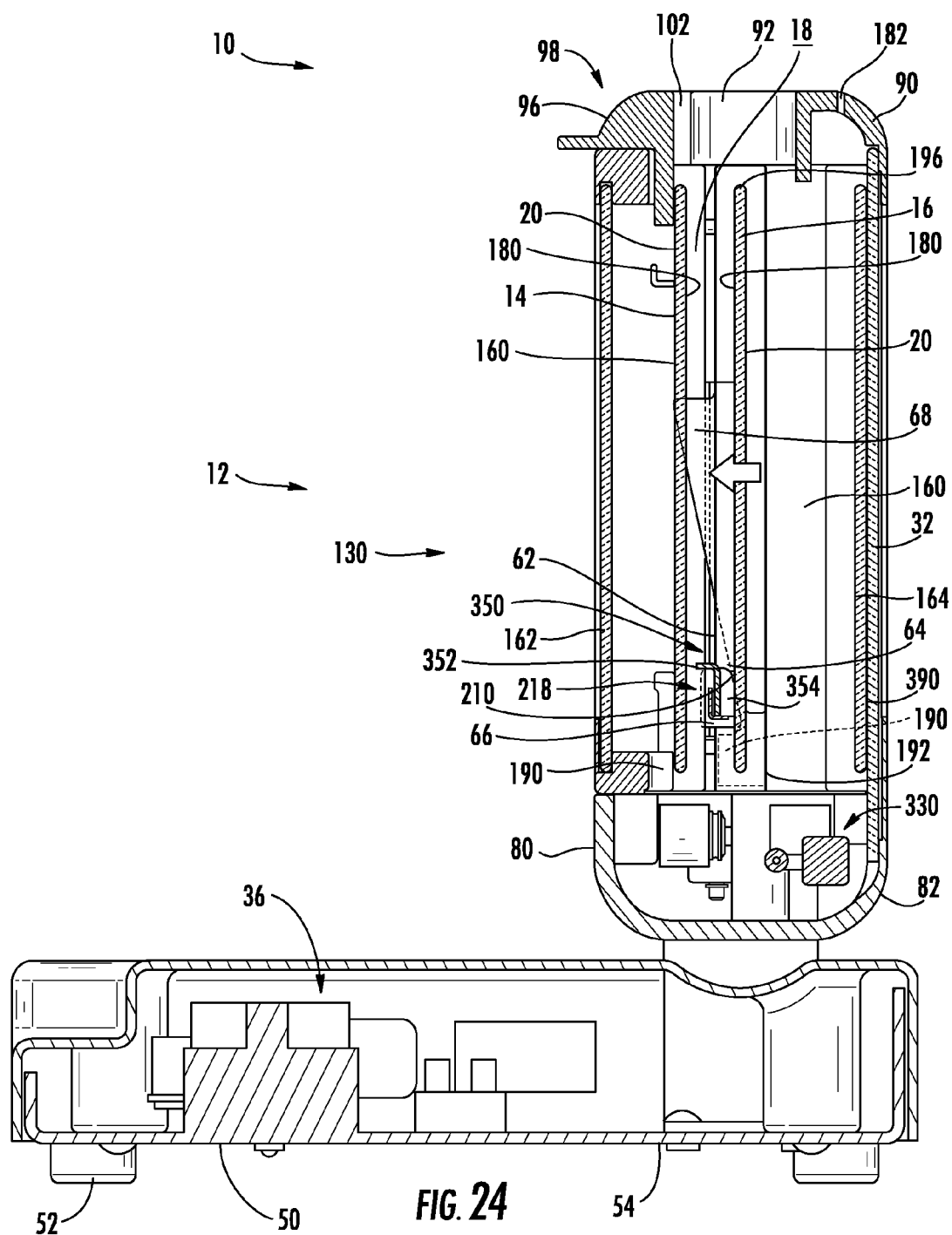
FIG. 24 is a cross-sectional view of the cooking appliance of FIG. 21, taken along line XXIV-XXIV.
Figure 25:
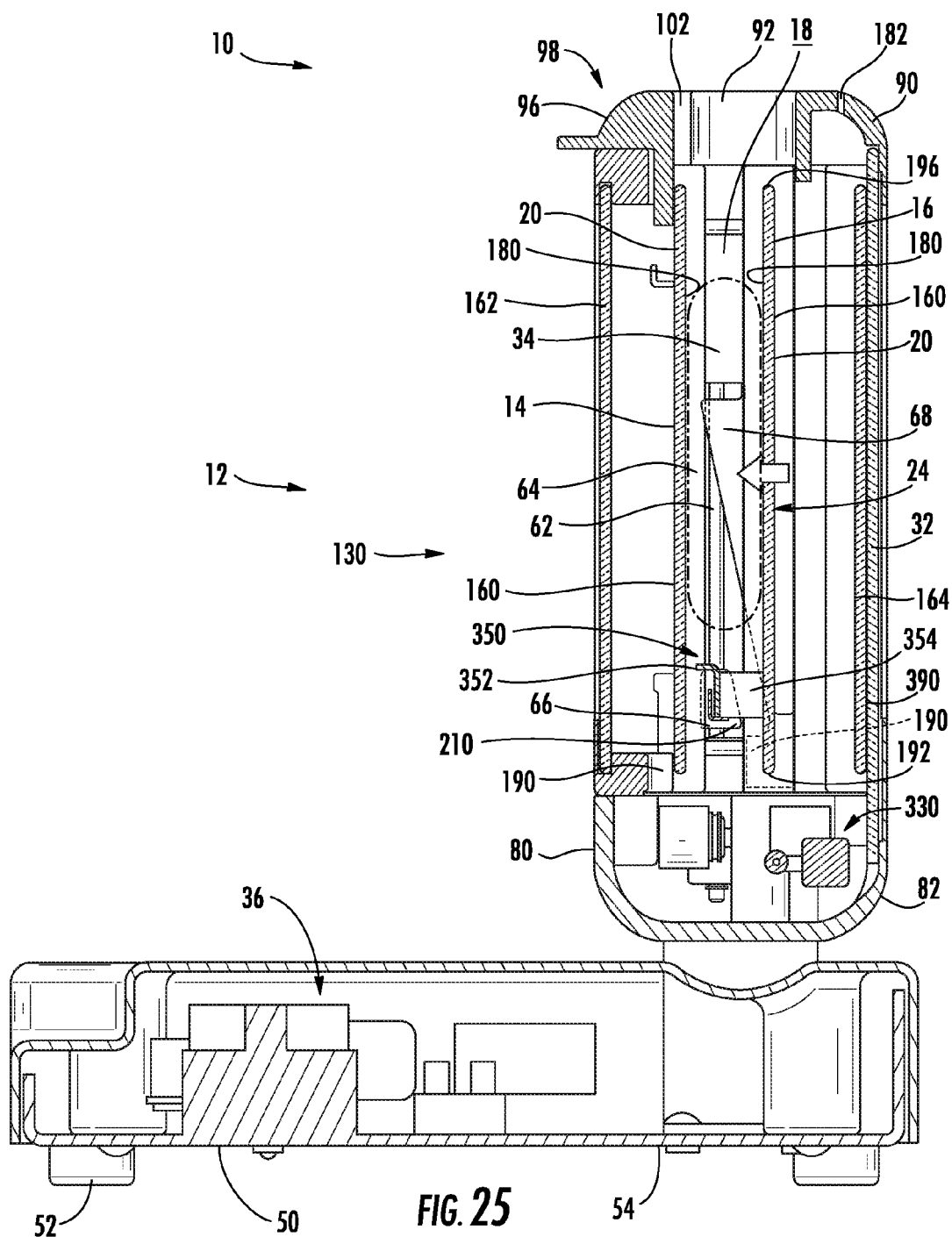
FIG. 25 is a cross-sectional view of the cooking appliance of FIG. 24, with the first and second plates engaging opposing sides of a food item.
Figure 29:
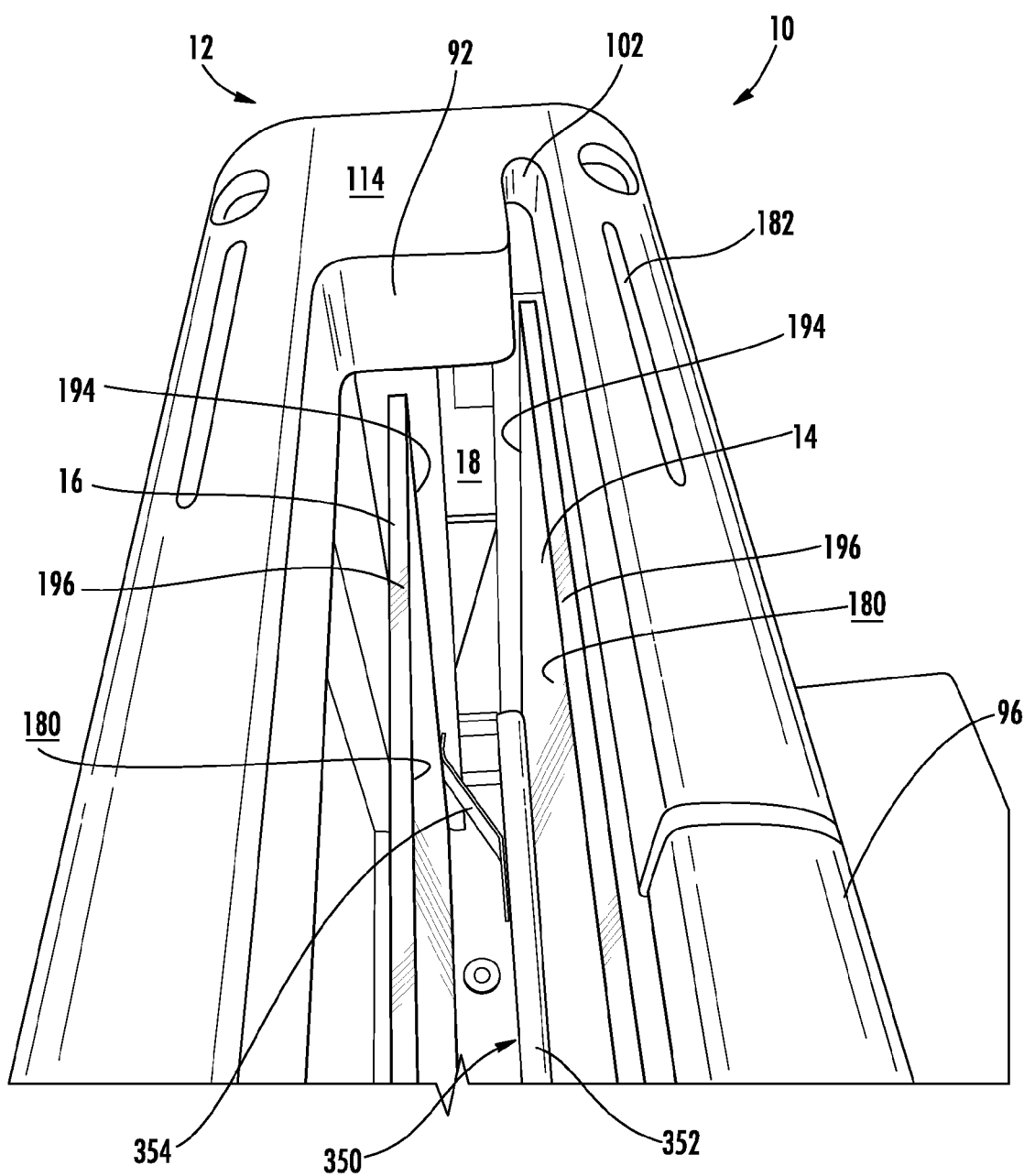
FIG. 29 is a top forced perspective view of an embodiment of a cooking appliance looking into the cavity, between the first and second plates.
Figure 30:
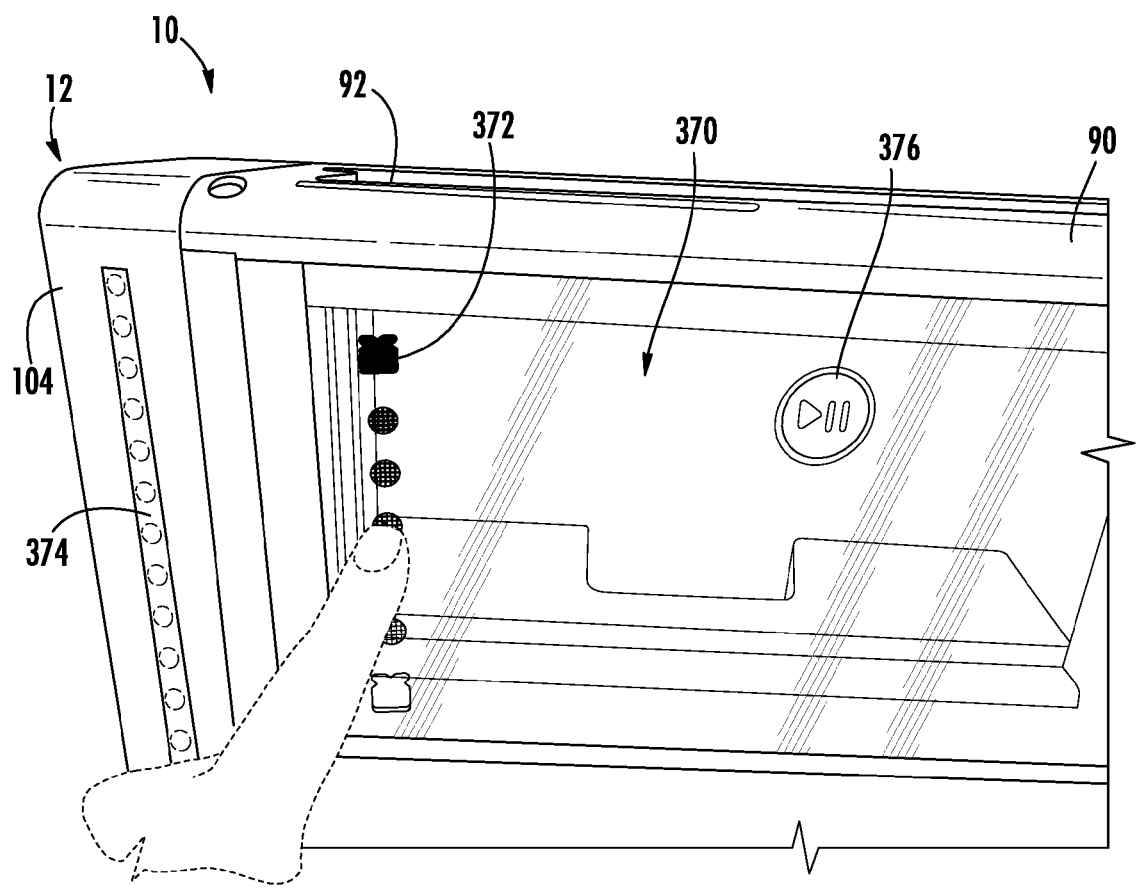
FIG. 30 is a front perspective view of the cooking appliance showing operation of the user interface.

As illustrated in FIGS. 7 and 12, the first plate 14 is slidably removable from the housing 12 by hand without the use of tools. In this manner, the toolless removability of the first plate 14 allows the user to conveniently clean the areas proximate the cavity 18 of the housing 12. The handle 96 of the first plate 14 allows the user to easily grasp and move the first plate 14, between the inserted position 98 to the extended position 100. It should be understood that in alternate embodiments, the second plate 16 may also be selectively removable.

Referring now to FIGS. 19-25, the second plate 16 is operable between the cooking and non-cooking positions 24, 26. The pair of ramp members 68 are disposed on the side edges 194 of the second plate 16. Each ramp member 68 slants upward and toward the third plate 162 to engage the vertically operable post 66 disposed proximate the cavity 18 between the first and second plates 14, 16. Each of the ramp members 68 is configured to selectively engage inclined portions 210 of the vertically operable post 66. The inclined portions 210 of the vertically operable post 66 is configured to be slanted at an angle that is substantially similar to the angle of each of the ramp members 68. Additionally, the second plate 16, and the pair of ramp members 68, are biased toward the respective inclined portions 210 of the vertically operable post 66. In this manner, as the vertically operable post 66 moves along the inner frame guides 64, the ramp members 68 are biased toward the inclined portions 210 of the vertically operable post 66, such that when the vertically operable post 66 is in an upper position 216, the ramp members 68 and the second plate 16 are moved distal from the first plate 14 to define the non-cooking position 26. As the vertically operable post 66 moves downward toward a lower position 218, the ramp members 68 and the second plate 16 are biased toward the second plate 16 as the ramp members 68 slide along the inclined portions 210 of the vertically operable post 66. In this manner, the second plate 16 is moved into the cooking position 24.

Referring again to FIGS. 22-25, when a food item 34 is placed within the cavity 18, and the vertically operable post 66 moves to the lower position 218, and the second plate 16 moves toward the first plate 14, the first and second plates 14, 16 are configured to come into engagement with opposing sides of the food item 34. When the first and second plates 14, 16 come into engagement with opposite sides of the food item 34, and the vertically operable post 66 has not reached the lower position 218, the second plate 16 is biased against the food item 34, rather than the inclined portions 210 of the vertically operable post 66. The vertically operable post 66 continues toward the lower position 218, thereby disengaging the inclined portions 210 of the vertically operable post 66 from the ramp members 68 of the second plate 16. When the vertically operable post 66 reaches the lower position 218 and the first and second plates 14, 16 are disposed on opposing sides of the food item 34 to be cooked, the first and second plates 14, 16 and the vertically operable post 66 define the cooking position 24.

Under certain circumstances, a food item 34 disposed within the cavity 18 may be thinner than the perpendicular distance between the first and second plates 14, 16 when the vertically operable post 66 is in the lower position 218. In these circumstances, the cooking position 24 is defined by the vertically operable post 66 being in the lower position 218 and the first and second plates 14, 16 being at least proximate the food item 34.

The biasing force exerted on the ramp members 68 and the second plate 16 in the direction of the first plate 14 is provided by various tensioning mechanisms that can include, but are not limited to, springs, elastic members, or other types of tensioning members that can place the biasing force upon the ramp members 68 and the second plate 16 towards the third plate 162.

As illustrated in FIG. 3, the movement of the vertically operable post 66 is controlled by a linear actuator 330 disposed between the inner frame 56 and the lower framing member 82, wherein the linear actuator 330 includes a biasing mechanism 332 that biases the vertically operable post 66 in the upper position 216. The linear actuator 330 includes a motor that acts against the biasing force to draw the vertically operable post 66 toward the lower position 218. When it is necessary for the vertically operable post 66 to move to the upper position 216, a regulating member 334 of the linear actuator 330 regulates the movement of the vertically operable post 66 in an upward direction at a speed sufficient to push any food items 34 disposed within the cavity 18 toward the access aperture 92 without ejecting the food item 34 from the access aperture 92. In various alternate embodiments, various gearing mechanisms, cams, or other mechanical interfaces can be used to operate the movement of the vertically operable post 66.

In various embodiments, the ramp members 68 of the second plate 16 and the inclined portions 210 of the vertically operable post 66 are made of materials having a substantially low friction, where such materials can include, but are not limited to, silicone, nylon, or other low friction materials. In this manner, substantially minimal force is necessary to operate the second plate 16, as there is minimal friction loss in the engagement between the ramp members 68 and the inclined portions 210 of the vertically operable post 66.

In various alternate embodiments, the inclined portion of the vertically operable post 66 and the ramp members 68 are slidably engaged, such that the vertical movement of the inclined portions 210 provides the sole biasing force exerted against the ramp members 68 of the second plate 16. In this embodiment, the vertical movement of the vertically operable post 66 from the upper position 216 toward the lower position 218 is stopped when the first and second plates 14, 16 each engage opposing sides of a food item 34 placed within the cavity 18 to be cooked. This configuration substantially prevents the food item 34 placed within the cavity 18 from being crushed by the movement of the second plate 16 towards the first plate 14. Accordingly, the cooking position 24 in this alternate embodiment is defined by the first and second plates 14, 16 being engaged with the opposing sides of a food item 34 placed within a cavity 18.

In other various embodiments, a biasing force can be placed upon the ramp members 68 and the second plate 16 away from the first plate 14, such that the tensioning mechanism exerting the biasing force is substantially at rest when the second plate 16 is in the non-cooking position 26. In this embodiment, the inclined portion of the vertically operable post 66 is slidably engaged with the ramp members 68 of the second plate 16. When the vertically operable post 66 moves from the upper position 216 toward the lower position 218, the inclined portions 210 of the vertically operable post 66 exert a biasing force in the direction of the first plate 14 that overcomes the biasing force exerted on the second plate 16 away from the first plate 14. In this manner, the inclined portions 210 of the vertically operable post 66 bias the ramp members 68 and the second plate 16 in the direction of the first plate 14, until such time as the first and second plates 14, 16 engage opposing sides of the food 34 disposed within the cavity 18, or the vertically operable post 66 reaches the lower position 218, to define the cooking position 24. In this embodiment, when the first and second plates 14, 16 engage opposing sides of a food item 34 placed within the cavity 18, the downward movement of the vertically operable post 66 toward the lower position 218 is stopped to prevent the second plate 16 from substantially crushing the food item 34 placed within the cavity 18.

As illustrated in FIGS. 26-28, the cooking appliance 10 is configured to account for irregularly-shaped food items 34, or separate food items 34 having different thicknesses, by allowing the second plate 16 to tilt and twist within the housing 12. When the vertically operable post 66 is disposed in the upward position and the second plate 16 is disposed in the non-cooking position 26, the second plate 16 is substantially parallel with the first plate 14, and is biased toward the cooking position 24 by a plurality of springs. As the vertically operable post 66 moves to the lower position 218, and the second plate 16 moves towards the first plate 14 in an articulating fashion, the plurality of springs are configured to allow the second plate 16 to tilt, such that the top edge 196 of the second plate 16 is a different distance from the first plate 14 than the lower edge 192 of the second plate 16. Additionally, the plurality of springs can afford the second plate 16 a twisting movement within the cavity 18, such that the one side edge 194 of the second plate 16 is a different distance from the first plate 14 than the other side edge 194 of the second plate 16. In this manner, as the second plate 16 moves towards the first plate 14, the plurality of springs allows the second plate 16 to twist and tilt to accommodate food items 34 that are placed in the cavity 18 having irregular cross sections, where one portion of a food item 34 has a different cross-sectional thickness than another portion of the food item 34, or where two separate food items 34, each having different cross-sectional thicknesses can be accommodated. Accordingly, the food item or items 34 are substantially in contact with the first and second plates 14, 16 such that the first and second plates 14, 16 are disposed adjacent to the food items 34.

In various embodiments, when the vertically operable post 66 and the first and second plates 14, 16 are disposed in the cooking position 24, the bus bars 190 of the first and second plates 14, 16 are engaged, such that they are configured to receive electrical power once the selected cooking cycle is selected and initiated. Conversely, when the vertically operable post 66 for the first and second plates 14, 16 are not in the cooking position 24, the cooking appliance 10 can be configured to disengage the bus bars 190 of the first and second plates 14, 16, such that electrical power cannot be delivered to the bus bars 190 or the first and second plates 14, 16. Similarly, when the first plate 14 is moved to the extended position 100, the bus bar 190 of the first plate 14 is disengaged from the electrical supply components 36 of the cooking appliance 10 such that no electrical power can be delivered to the first plate 14 while disposed out of the inserted position 98. Once the first plate 14 is placed back into the inserted position 98, the bus bar 190 of the first plate 14 can be reengaged such that electrical power can be delivered to the first plate 14.

As illustrated in FIGS. 3, 17, 22-25 and 29, the vertically operable post 66 member includes a lift tray 350 extending laterally between the inclined portions 210 of the vertically operable post 66. The lift tray 350 is configured to extend laterally through the cavity 18 between the first and second plates 14, 16. In this manner, the lift tray 350 is configured to substantially prevent food items 34 from falling below the first and second plates 14, 16. The lift tray 350 includes a lift bar 352 positioned proximate the first plate 14 and a plurality of compression tabs 354 that extend outward from a surface of the lift bar 352 toward the second plate 16, wherein the compression tabs 354 slidably engage the inner surface 180 of the second plate 16. As the vertically operable post 66 and the lift tray 350 are moved from the upper to the lower position 218, and the second plate 16 moves towards the first plate 14, the compression tabs 354 maintain contact with the inner surface 180 of the second plate 16 and are configured to compress toward the lift bar 352, as the second plate 16 moves toward the first plate 14. In this manner, the lift bar 352 and the compression tabs 354 are configured to create a platform on which food items 34 can be placed within the cavity 18, while also allowing crumbs and other fine particulate matter to fall through the lift tray 350 to a crumb collection area disposed beneath the first and second plates 14, 16. A crumb collection tray disposed in the crumb collection area is configured to be selectively removed such that particulate matter can be removed from within the housing 12 of the cooking appliance.

In various alternate embodiments, when the housing 12 is disposed in the horizontal position 132, food items 34 can be placed through the access aperture 92 and into the cavity 18 horizontally, such that the vertical operation of the lift tray 350 may not be necessary or desired. In various embodiments, when the housing 12 is in the horizontal position 132, the operation of the lift tray 350 can be disengaged, once the housing 12 is disposed in the horizontal position 132. In this manner, the operation of the vertically operable post 66, which moves horizontally when the housing 12 is in the horizontal position 132, operates only the movement of the second plate 16 relative to the first plate 14. Additionally, when the housing 12 is in the horizontal position 132, the first plate 14 is selectively removable from the cavity 18, such that food items 34, such as sandwiches, and other stackable food items 34 that are typically handled horizontally, can be placed on the inner surface 150 of the first plate 14 positioned in the extended position 100. In such an embodiment, the first plate 14 can be moved to the inserted position 98 within the cavity 18, such that the food items 34 can be placed within the cavity 18 between the first and second plates 14, 16 in the proper position for cooking the food item 34. With the first plate 14 in the inserted position 98, the cooking cycle can be activated and the second plate 16 moved toward the first plate 14 to place the first and second plates 14, 16 in the cooking position 24. Upon completion of the cooking cycle, the second plate 16 is moved away from the first plate 14, such that the food item 34 can be removed from the cavity 18 by sliding the first plate 14 out from the cavity 18 to the extended position 100 for retrieval of the food item 34.

In other various embodiments, the operation of the lift tray 350, and the operation of the second wall, can be separated such that they are controlled by separate mechanisms that can be independently disengaged and engaged, depending upon the position of the housing 12 and the desired cooking cycle selected by the user.

As illustrated in FIGS. 1, 11, 14 and 30, the housing 12 includes the user interface 28 disposed on a surface of at least one of the outer plates 32. The user interface 28 can be a resistive or capacitive touch screen interface 370 that is etched upon or otherwise disposed on the surface of one of the outer plates 32. The touch screen interface 370 is in operable communication with the bus bars 190 of the first and second plates 14, 16 and the linear actuator 330 that controls the vertical movement of the vertically operable post 66 to control the distance between the first and second plates 14, 16 and the position of the lift tray 350. The user interface 28 can include a browning control interface 372 configured such that the user can slide a finger against the browning control interface 372 in a vertical direction, to increase or decrease the cooking time and/or temperature. A browning setting display 374 disposed within the exterior frame 80 of the housing 12, adjacent to the plates, provides indicia that reflects the selected cooking time and/or temperature. This indicia can include a color display, where a changing color display reflects the user selection. Alternatively, the browning setting display 374 can include a series of LCD lights that light up in progression as the cooking time and/or temperature is increased, and turn off in progression as the cooking time and/or temperature is decreased. In other alternate embodiments, the browning setting display 374 is a digital and/or analog display that provides a predetermined number that corresponds to the cooking time and/or temperature selected by the user. The touch screen interface 370 can also include a play/pause interface 376 that is configured to selectively engage, terminate, or interrupt a cooking cycle of the cooking appliance 10. The touch screen interface 370 can also include a program interface 378, having differentiating graphic indicia, reflecting various cooking programs. The various programs and corresponding indicia can be represented by shapes of the various food items 34 that may require differentiated cooking programs, where the various food items 34 include, but are not limited to, bagels, bread slices, sandwiches, pastries, and other food items 34 that are able to be cooked within the cooking appliance. Various indicia disposed within the housing 12 adjacent to the plates can be included to indicate to the user the current program selection, the temperature of the cavity 18, the cooking time remaining on this particular program, or other various indicia related to cooking operations of the cooking appliance 10.

In various embodiments, the cooking appliance 10 can include lighting features disposed proximate the cavity 18 that are configured to illuminate the touch screen interface 370 as well as the cavity 18, such that the user can use the cooking appliance 10, and visually evaluate the cooking progress of the particular food item 34, without having to turn on exterior lighting to operate the cooking appliance 10. In various embodiments, the touch screen interface 370 can be disposed on both the third and fourth plates 162, 164, such that the cooking appliance 10 can be operated from either side of the housing 12.

Additional user options include, but are not limited to an extend feature whereby the selected cooking cycle can be extended by a predetermined length of time, a sound-off feature that provides an auditory signal when the cooking cycle is complete or substantially complete, a crumb tray indicator that indicates when the crumb tray should be emptied, as well as other features that relate to the operation of the cooking appliance. The cooking appliance 10 can also include a master shut-off switch 398 (shown in FIG. 15).

In various embodiments, the cooking appliance 10 can include a data connection 400 (shown in FIG. 16) through which the cooking appliance 10 cad download and upload information relating to the operation of the cooking appliance, such as new cooking programs, service data, and the like. An external power receptacle 402 (shown in FIG. 15) can also be included in the cooking appliance 10 through which electrical power can be provided from an electrical outlet to the cooking appliance 10.

In various alternate embodiments, the touch screen interface 370 can be placed on a surface of the third or fourth plates 162, 164, or both. Alternatively, the touch screen interface 370 can be disposed on a separate outer plate 32 that is specifically configured to incorporate the touch screen interface 370. In such an embodiment, a fifth plate 390 includes the touch screen interface 370 and is disposed adjacent to the third or fourth plates 162, 164, or both.

In use, the user can place the housing 12 in either the vertical or horizontal positions 130, 132. Typically, the housing 12 will be placed in the horizontal position 132 to cook stacked food items 34, such as sandwiches, wraps and the like. The vertical position 130 of the housing 12 is typically used to perform toasting functions on generally monolithic food items 34 such as slices of baked goods, pastries and the like.

When the housing 12 is disposed in the horizontal position 132, the first plate 14 can be moved to the extended position 100 and the food item 34 placed in the inner surface 180 of the first plate 14. The first plate 14 is then moved into the inserted position 98 such that the food item 34 is disposed through the access aperture 92 and into the cavity 18 to be cooked. When the housing 12 is disposed in the vertical position 130, the food item 34 can be disposed directly through the access aperture 92 and dropped into the cavity 18 such that the food item 34 is supported by the lift tray 350.

The user can then use the user interface 28 to select the desired cooking settings or program using the browning control interface 372 and/or the program interface 378. Once the desired settings are selected, the user can initiate the cooking operation by using the play/pause interface 376 which activates the movement of the second wall toward the first plate 14 and into the cooking position 24 such that the first and second plates 14, 16 engage opposite sides of the food item 34. The lift tray 350 is also moved along with the vertically operable post 66 to the lower position 218, such that when the housing 12 is in the vertical position 130, the food item 34 is lowered further into the cavity 18. Once the cooking appliance 10 is in the cooking position 24, the bus bars 190 are activated and a predetermined electrical current is delivered to and through the coating 20 disposed on the first and second plates 14, 16. In this manner, the first and second plates 14, 16 are heated and are configured to be the heating elements of the cooking appliance.

The user can, at all times, see into the cavity 18 to evaluate the level of browning of the food item 34. If the appropriate level of browning is achieved before the predetermined end of the cooking cycle, the user can engage the play/pause interface 376 to interrupt the cooking cycle. When so interrupted, the flow of electricity to the bus bars 190 is interrupted and the second plate 16 and the lift tray 350 are moved out of the cooking position 24 and into the non-cooking position 26 so that the food item 34 can be removed. If additional browning is desired, the user can again select the play/pause interface 376 to continue the cooking cycle from where it was interrupted. Once the predetermined cooking cycle is complete, the cooking appliance 10 automatically moves the second plate 16 and/or the lift bar 352 out of the cooking position 24 and into the non-cooking position 26 so that the food item 34 can be removed from the cavity 18.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A cooking appliance comprising:
    a housing including first and second plates, the first and second plates being at least partially translucent and parallel with one another;
    a cavity defined between the first and second plates;
    a partially conductive coating disposed on a portion of the first and second plates proximate the cavity;
    a cam mechanism operably coupled with the second plate, wherein the cam mechanism is configured to move the second plate between a cooking position and a non-cooking position, and wherein the cam mechanism includes a linearly translatable guide configured to engage a ramp in communication with the second plate, and wherein linear translation of the guide moves the ramp, and consequently the second plate, relative to the first plate; and
    a user interface accessible from an exterior surface of the housing, wherein the user interface is in electrical communication with the partially conductive coating, the partially conductive coating being in thermal communication with the cavity.

2. The cooking appliance of claim 1, wherein the partially conductive coating is tin oxide.

3. The cooking appliance of claim 1, wherein the user interface includes one of resistive and capacitive touch screen members on an exterior surface of an outer plate, wherein the outer plate is at least partially translucent.

4. The cooking appliance of claim 1, wherein the user interface is a touch screen interface having indicia etched on an exterior surface of an outer plate, wherein the outer plate is at least partially translucent.

5. The cooking appliance of claim 1, wherein the housing rests upon a base, and wherein the housing is pivotally operable between vertical and horizontal positions.

6. The cooking appliance of claim 1, wherein at least one of the first and second plates are slidably toollessly removable from the housing.

7. A partially transparent cooking appliance comprising:
    first and second plates defining an externally accessible cavity therebetween, wherein the first and second plates are at least partially translucent;
    a base pivotally coupled with the first and second plates, the first and second plates being operable between a horizontal position and a vertical position relative to the base;
    an electrically resistive coating disposed on at least a portion of the first and second plates, wherein the electrically resistive coating is in thermal communication with the cavity;
    a cam mechanism operably coupled with at least one of the first and second plates, wherein the first and second plates are operable between first and second distances relative to one another, and wherein the cam mechanism includes a linearly translatable guide configured to engage a ramp in communication with the second plate, and wherein linear translation of the guide moves the ramp, and consequently the second plate, relative to the first plate; and
    a user interface disposed on an exterior surface of an outer plate, the user interface being in electrical communication with the electrically resistive coating.

8. The partially transparent cooking appliance of claim 7, wherein the first, second and outer plates are at least partially transparent, and wherein the first, second and outer plates are substantially parallel.

9. The partially transparent cooking appliance of claim 7, wherein the electrically resistive coating is tin oxide.

10. The partially transparent cooking appliance of claim 7, wherein the user interface is a touch screen interface having indicia defined within an exterior surface of the outer plate.

11. The partially transparent cooking appliance of claim 7, wherein the user interface includes one of resistive and capacitive touch screen members on an exterior surface of the outer plate.

12. The partially transparent cooking appliance of claim 7, wherein at least one of the first and second plates are slidably toollessly removable from a housing.

13. The partially transparent cooking appliance of claim 7, wherein a housing includes an access aperture proximate the first and second plates and in operable communication with the externally accessible cavity.

14. A pivotally operable cooking appliance comprising:
a housing defining an access aperture and a cavity, the housing including first and second plates, wherein at least one of the first and second plates defines a translucent window;
a conductive coating disposed on at least a portion of the first and second plates proximate the cavity and in thermal communication with the cavity;
a cam mechanism disposed in the housing and in operable communication with the second plate, wherein the cam mechanism is configured to move the second plate relative to the first plate, and wherein the cam mechanism includes a linearly translatable guide configured to engage a ramp in communication with the second plate, and wherein linear translation of the guide moves the ramp, and consequently the second plate, relative to the first plate; and
a user interface disposed on an exterior surface of an outer plate, wherein the user interface is in electrical communication with the conductive coating, and wherein the outer plate further defines the translucent window.

15. The pivotally operable cooking appliance of claim 14, wherein the conductive coating is tin oxide.

16. The pivotally operable cooking appliance of claim 14, wherein the user interface includes a touch screen interface having indicia etched on an exterior surface of the outer plate.

17. The pivotally operable cooking appliance of claim 14, wherein the housing is pivotally coupled with a base and is pivotally operable between vertical and horizontal positions relative to the base, and wherein at least one of the first and second plates are toollessly removable from the housing.

* * * * *